(12) United States Patent
Han et al.

(10) Patent No.: US 11,039,493 B2
(45) Date of Patent: Jun. 15, 2021

(54) ELECTRONIC DEVICE FOR SUPPORTING DATA COMMUNICATION AND METHOD THEREFOR

(71) Applicant: Samsung Electronics Co., Ltd., Suwon-si (KR)

(72) Inventors: Jaekwang Han, Suwon-si (KR); Sungin Kim, Suwon-si (KR); Hongshik Kim, Suwon-si (KR); Seonghan Park, Suwon-si (KR); Ansik Shin, Suwon-si (KR); Euisung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/522,000

(22) Filed: Jul. 25, 2019

(65) Prior Publication Data

US 2020/0053806 A1 Feb. 13, 2020

(30) Foreign Application Priority Data

Aug. 8, 2018 (KR) ........................ 10-2018-0092705

(51) Int. Cl.
*H04W 76/15* (2018.01)
*H04W 88/06* (2009.01)
*H04W 88/16* (2009.01)

(52) U.S. Cl.
CPC ............ *H04W 76/15* (2018.02); *H04W 88/06* (2013.01); *H04W 88/16* (2013.01)

(58) Field of Classification Search
CPC ....... H04W 76/10; H04W 88/04; H04W 8/24; H04W 76/15; H04W 36/0011
See application file for complete search history.

(56) References Cited

U.S. PATENT DOCUMENTS

| 8,358,601 B2 | 1/2013 | Kim et al. |
| 8,358,602 B2 | 1/2013 | Puthiyandyil et al. |

(Continued)

FOREIGN PATENT DOCUMENTS

| CN | 103828409 A | 5/2014 |
| CN | 105636151 A | 6/2016 |

(Continued)

OTHER PUBLICATIONS

3rd Generation Partnership Project, Technical Specification Group Services and System Aspects, 3GPP TR 23.853, V0.4.0, May 2012, Valbonne, France.

(Continued)

*Primary Examiner* — Raj Jain
(74) *Attorney, Agent, or Firm* — Jefferson IP Law, LLP

(57) ABSTRACT

An electronic device is provided. The electronic device includes a communication circuitry, a processor, and a memory. The memory stores instructions that, when executed, cause the processor to obtain application information comprising information of at least one application configured to perform data communication using a first packet data network (PDN), establish a first PDN connection to the first PDN and a second PDN connection to a second PDN using the communication circuitry, determine whether a first application, which requests data transmission through the second PDN connection, is an application included in the application information, when the first application is included in the application information, transmit data associated with the first application to the first PDN, and, when the first application is not included in the specified application information, and transmit the data associated with the first application to the second PDN.

20 Claims, 14 Drawing Sheets

(56) References Cited

U.S. PATENT DOCUMENTS

| | | | |
|---|---|---|---|
| 8,449,443 B2 | 5/2013 | Rodefeld et al. | |
| 8,743,812 B2 | 6/2014 | Yin et al. | |
| 8,806,042 B2 | 8/2014 | Touati et al. | |
| 9,986,478 B2* | 5/2018 | Singh | H04W 36/14 |
| 10,201,029 B2 | 2/2019 | Kekki et al. | |
| 10,321,496 B2 | 6/2019 | Lubenski | |
| 10,341,911 B2 | 7/2019 | Kim et al. | |
| 10,440,091 B2* | 10/2019 | Ban | H04L 67/02 |
| 10,455,626 B2 | 10/2019 | Kawasaki et al. | |
| 2001/0043579 A1* | 11/2001 | Tourunen | H04W 36/02 370/331 |
| 2009/0109986 A1 | 4/2009 | Zhao et al. | |
| 2010/0027448 A1 | 2/2010 | Puthiyandyil et al. | |
| 2011/0064056 A1 | 3/2011 | Zhao et al. | |
| 2012/0054841 A1* | 3/2012 | Schultz | G06F 21/51 726/6 |
| 2012/0147839 A1 | 6/2012 | Yin et al. | |
| 2012/0215931 A1 | 8/2012 | Touati et al. | |
| 2013/0089076 A1 | 4/2013 | Olvera-Hernandez et al. | |
| 2014/0269515 A1 | 9/2014 | Zhao et al. | |
| 2015/0029875 A1 | 1/2015 | Zhu et al. | |
| 2015/0029879 A1 | 1/2015 | Chou et al. | |
| 2015/0029910 A1 | 1/2015 | He et al. | |
| 2015/0071143 A1* | 3/2015 | Wang | H04W 52/0209 370/311 |
| 2016/0255540 A1* | 9/2016 | Kweon | H04W 76/15 370/237 |
| 2016/0360458 A1 | 12/2016 | Lubenski | |
| 2017/0034775 A1 | 2/2017 | Mandanapu | |
| 2017/0064585 A1 | 3/2017 | Kim et al. | |
| 2017/0105227 A1* | 4/2017 | Pinheiro | H04W 72/087 |
| 2017/0118787 A1 | 4/2017 | Kekki et al. | |
| 2017/0188275 A1 | 6/2017 | Kim et al. | |
| 2018/0007057 A1* | 1/2018 | Faccin | H04W 12/06 |
| 2018/0206286 A1* | 7/2018 | Pragada | H04W 76/25 |
| 2018/0302935 A1 | 10/2018 | Kawasaki et al. | |
| 2019/0028962 A1* | 1/2019 | Chun | H04W 76/10 |
| 2020/0053806 A1* | 2/2020 | Han | H04W 76/15 |

FOREIGN PATENT DOCUMENTS

| | | |
|---|---|---|
| CN | 106465436 A | 2/2017 |
| CN | 107615871 A | 1/2018 |
| EP | 3 306 961 A1 | 4/2018 |
| EP | 3 025 533 B1 | 6/2018 |
| WO | 2012/135793 A2 | 10/2012 |
| WO | 2015/150875 A1 | 10/2015 |

OTHER PUBLICATIONS

International Search Report dated Nov. 12, 2019, issued in International Patent Application No. PCT/KR2019/009287.
Extended European Search Report dated Dec. 9, 2019, issued in European Patent Application No. 19189354.4.
Chinese Office Action dated Dec. 3, 2020, issued in Chinese Application No. 201910728023.7.

* cited by examiner

ELECTRONIC DEVICE FOR SUPPORTING DATA COMMUNICATION AND METHOD THEREFOR

CROSS-REFERENCE TO RELATED APPLICATION(S)

This application is based on and claims a priority under 35 U.S.C. § 119(a) of a Korean patent application number 10-2018-0092705, filed on Aug. 8, 2018, in the Korean Intellectual Property Office, the disclosure of which is incorporated by reference herein in its entirety.

BACKGROUND

1. Field

The disclosure relates to an electronic device for supporting data communication and a method therefor.

2. Description of Related Art

A carrier (e.g., a mobile network operator (MNO)) of a cellular network may provide a variety of charge planes for performing wireless data communication. For example, the charge plan may be configured based on the amount of data. The MNO may provide free data communication independent of the charge plan with respect to a specific application. For example, the MNO may provide free data communication with respect to a connection to an online customer service application. For another example, the MNO may provide free data communication with respect to a specific application (e.g., a game application) for the increase of users and public relations. For various reasons, the MNO may provide the free data communication for the specific application.

An electronic device may be connected to the cellular network (e.g., a long term evolution (LTE) network) over a packet data network (PDN). To configure a PDN connection, the electronic device may use identifier information (e.g., access point name (APN) information) of the PDN. For example, the MNO may configure different PDNs depending on a service type (e.g., the Internet, a multimedia message service (MMS), or a voice over LTE (VoLTE)). For example, the MNO may configure a separate PDN for free data communication. The electronic device may perform data communication using a PDN identifier configured by the MNO.

The above information is presented as background information only to assist with an understanding of the disclosure. No determination has been made, and no assertion is made, as to whether any of the above might be applicable as prior art with regard to the disclosure.

SUMMARY

An electronic device may perform data communication using a PDN corresponding to a service type requested by an application. For example, when the application requests an internet connection, the electronic device may perform data communication using an internet PDN of a subscribed MNO. For example, when a specific PDN is specified for the application, the electronic device may use the specified PDN to transmit and receive data associated with the application.

For the electronic device to connect to the specified PDN (e.g., a separate PDN for free data communication), the application may request a connection to the specified PDN. In general, an identifier of the PDN may be differently configured according to an MNO. Thus, for a connection to a PDN specified by the MNO, an application may be corrected for each MNO. For example, an application manufacturer may provide a separate MNO dedicated application for each MNO with respect to the same game application.

Aspects of the disclosure are to address at least the above-mentioned problems and/or disadvantages and to provide at least the advantages described below. Accordingly, an aspect of the disclosure is to provide a method for performing data communication associated with an application over a specified PDN without separate correction of the application.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuitry, a processor operatively connected to the communication circuitry, and a memory operatively connected to the processor. The memory may store instructions that, when executed, cause the processor to obtain specified application information to perform data communication using a first packet data network (PDN), establish a first PDN connection to the first PDN and a second PDN connection to a second PDN using the communication circuitry, determine whether a first application, which requests data transmission through the second PDN connection, is an application included in application information included in the specified application information, when the first application is included in the specified application information, configure a first communication environment associated with the first PDN connection with respect to the first application and transmit data associated with the first application to the first PDN, and, when the first application is not included in the specified application information, configure a second communication environment associated with the second PDN connection with respect to the first application and transmit the data associated with the first application to the second PDN.

In accordance with another aspect of the disclosure, a data communication method is provided. The data communication method includes obtaining specified application information to perform data communication using a first packet data network (PDN), establishing a first PDN connection to the first PDN and a second PDN connection to a second PDN, determining whether a first application, which requests data transmission through the second PDN connection, is an application included in application information included in the specified application information, when the first application is included in the specified application information, transmitting data associated with the first application to the first PDN through the first PDN connection, and, when the first application is not included in the specified application information, transmitting the data associated with the first application to the second PDN through the second PDN connection.

In accordance with another aspect of the disclosure, an electronic device is provided. The electronic device includes a wireless communication modem, a processor operatively connected with the wireless communication modem, and a memory that is operatively connected with the processor and stores a first application program, a second application program, and a first framework program interfacing with the first application program and the second application program. The memory stores instructions that, when executed, cause the processor to receive a first internet protocol (IP) address from a first packet data network gateway (PGW), using the wireless communication modem, transmit and/or receive first data packets, each of which is associated with the first application and includes the first IP address, using the first internet network interface and the wireless communication modem, execute the first framework program, receive a second IP address different from the first IP address from a second PGW via the wireless communication modem, at least using the first framework program, and transmit and/or receive second data packets, each of which is associated with the second application program and includes the second IP address, using a second internet network interface and the wireless communication modem.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
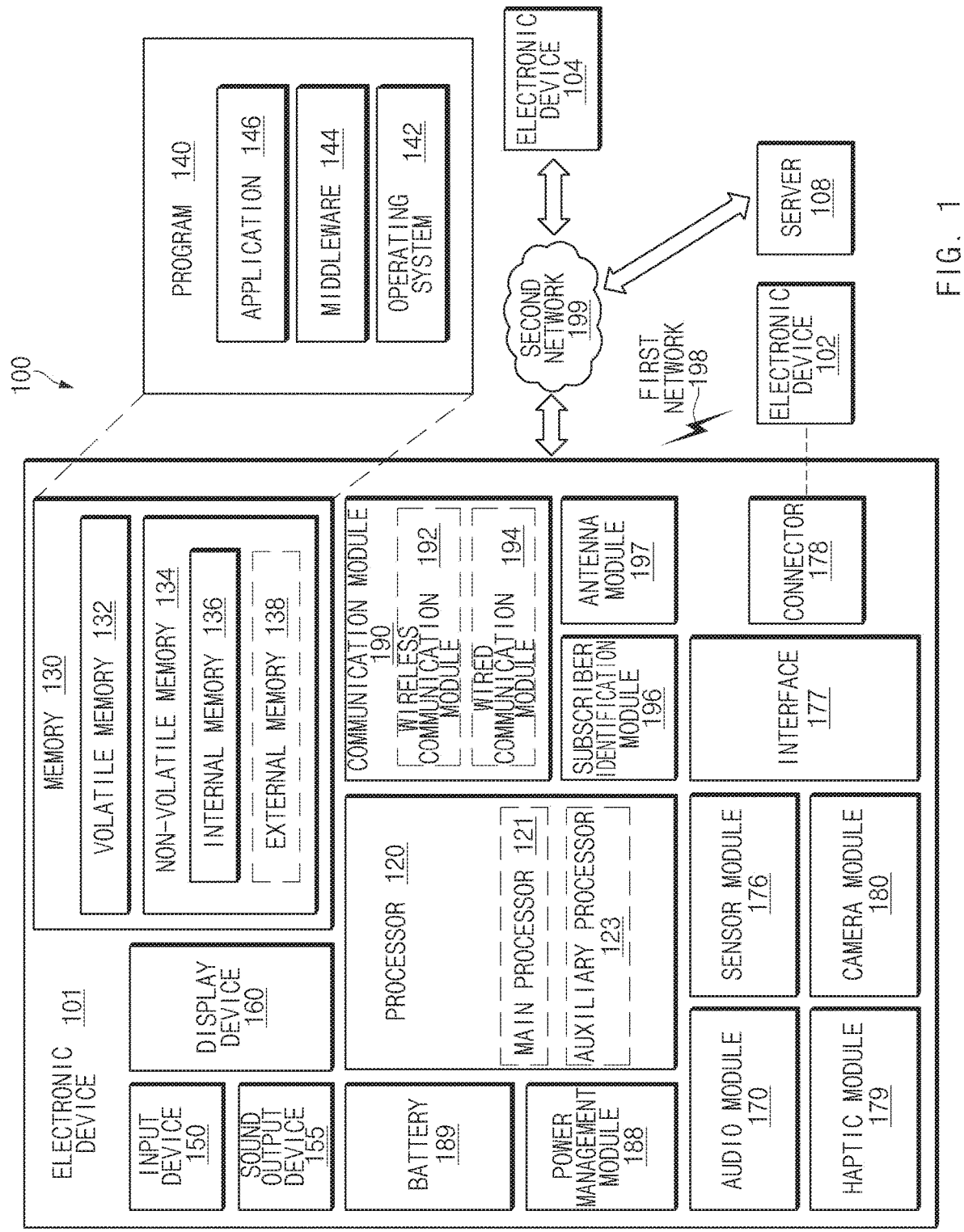
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connector 178 (e.g., a connecting terminal) may include a connector via which the electronic device 101 may be physically connected with the external electronic device (e.g., the external electronic device 102). According to an embodiment, the connector 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN)

communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
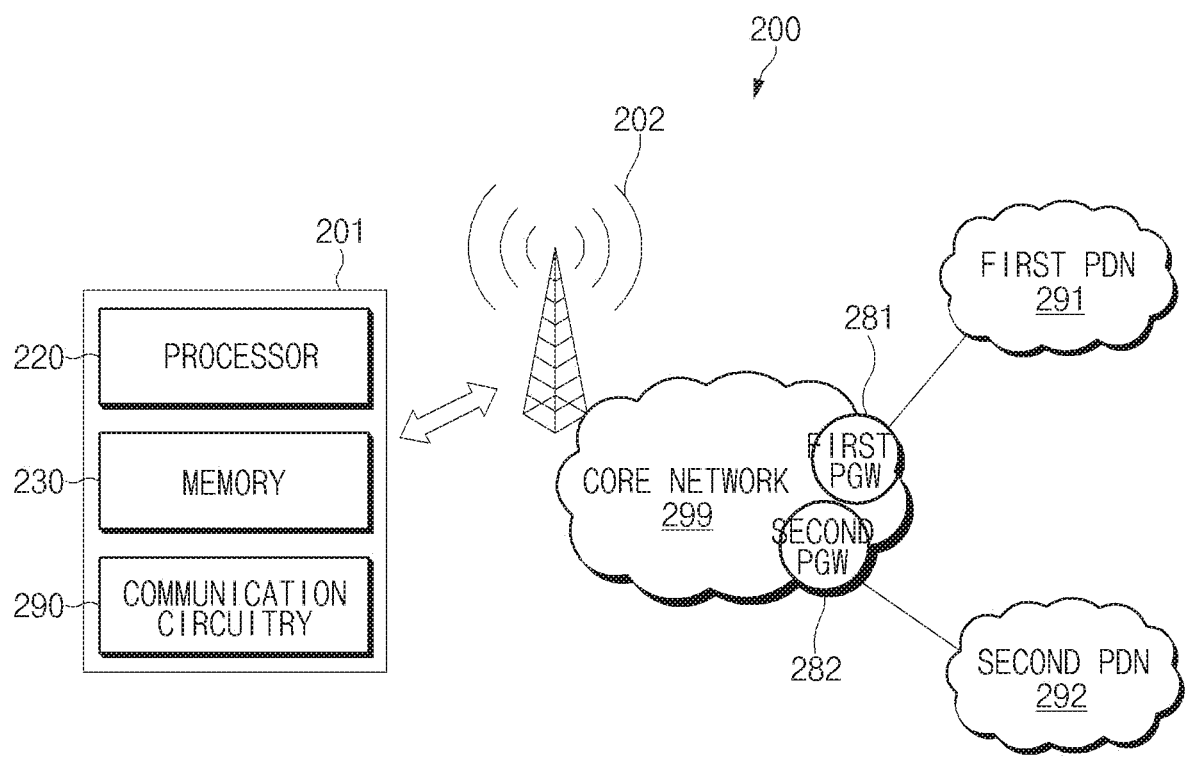
FIG. 2 is a drawing illustrating a communication environment of an electronic device according to an embodiment of the disclosure.

FIG. 2 is a drawing illustrating a communication environment of an electronic device according to an embodiment of the disclosure.

Referring to FIG. 2, according to various embodiments, an electronic device 201 (e.g., the electronic device 101 of FIG. 1) in a communication environment 200 may be connected to a first packet data network (PDN) 291 (e.g., the Internet) and/or a second PDN 292 (e.g., the Internet) over a core network 299 (e.g., an evolved packet core (EPC)) associated with a base station 202. For example, the electronic device 201 may be connected to the first PDN 291 through a first PDN gateway (PGW) 281. The electronic device 201 may be connected to the second PDN 292 through a second PGW 282.

According to various embodiments, the electronic device 201 may include a processor 220 (e.g., the processor 120 of FIG. 1), a memory 230 (e.g., the memory 130 of FIG. 1), and/or a communication circuitry 290 (e.g., the communication module 190 of FIG. 1). The components of the electronic device 201 shown in FIG. 2 are merely illustrative, and the electronic device 201 may further include another component which is not shown in FIG. 2 or may fail to include at least some of the shown components.

According to various embodiments, the processor 220 may include at least one processor. The processor 220 may include at least one of an application processor (AP), a communication processor (CP), and/or a baseband processor (BP). The processor 220 may be implemented with one or a plurality of chips. The processor 220 may be electrically or operatively connected with the other components (e.g., the memory 230 and/or the communication circuitry 290) of the electronic device 201. According to an embodiment, the processor 220 may be configured to control a function of the electronic device 201. For example, the processor 220 may control an operation of the electronic device 201 based on instructions stored in the memory 230 or an internal memory (not shown) of the processor 220.

According to various embodiments, the memory 230 may be at least electrically connected with the processor 220. The memory 230 may store instructions, when executed, causing the processor 220 to perform various operations.

According to various embodiments, the communication circuitry 290 may include at least one communication circuitry configured to transmit and receive a signal in a specified frequency band. For example, the communication circuitry 290 may include at least one of an intermediate frequency integrated circuit (IFIC), a radio frequency integrated circuit (RFIC), an antenna module, or an RF front end. For example, the communication circuitry 290 may include an antenna (e.g., the antenna module 197 of FIG. 1).

According to various embodiments, the base station 202 may be a base station (e.g., an evolved node B (eNB) or a next generation node B (gNB)) which supports cellular communication. For example, the base station 202 may be a base station which supports $3^{rd}$ generation, $4^{th}$ generation, and/or $5^{th}$ generation mobile communication. The base station 202 may be associated with at least one cell. According to an embodiment, the base station 202 may be connected to the core network 299.

According to various embodiments, the core network 299 may include various network entities for data communication and connectivity management for the electronic device 201. According to an embodiment, the core network 299 may include the first PGW 281 and the second PGW 282. For example, the first PGW 281 may operate as a data path to the first PDN 291 of an MNO associated with the core network 299. For example, the second PGW 282 may operate as a data path to the second PDN 292 of the MNO associated with the core network 299.

According to various embodiments, the core network 299 may connect the first PDN 291 and/or the second PDN 292 and the electronic device 201 based on a request from the electronic device 201.

According to an embodiment, the core network 299 may connect the electronic device 201 and the first PDN 291 based on an attach request to the first PDN 291. For example, an evolved packet system (EPS) bearer corresponding to a connection to the first PDN 291 may be established in the electronic device 201. For example, the attach request to the first PDN 291 may at least include information (e.g., access point name (APN) information) for identifying the first PDN 291. According to an embodiment, when the attach request to the first PDN 291 is received from the electronic device 201, the first PGW 281 may assign an IP address for the electronic device 201 to the electronic device 101. For example, the electronic device 201 may receive a message (e.g., an attach accept message) including a first IP address of the electronic device 201, assigned by the first PGW 281. The electronic device 201 may obtain an IP address (e.g., the first IP address) of the electronic device 201 associated with a first PDN connection by receiving the attach accept message. According to an embodiment, the electronic device 201 may authenticate the electronic device 201 on the core network 299 using information (e.g., a user ID and a password) for authentication associated with the first PDN 291 of the electronic device 201.

According to an embodiment, the core network 299 may connect the electronic device 201 and the second PDN 292 based on an attach request to the second PDN 292. For example, the attach request to the second PDN 292 may at least include information (e.g., APN information) for identifying the second PDN 292. For example, an EPS bearer corresponding to a connection to the second PDN 292 may be configured in the electronic device 201. According to an embodiment, when the attach request to the second PDN 292 is received from the electronic device 201, the second PGW 282 may assign an IP address for the electronic device 201 to the electronic device 201. For example, the electronic device 201 may receive a message (e.g., an attach accept message) including a second IP address of the electronic device 201, assigned by the second PGW 282. The electronic device 201 may obtain an IP address (e.g., the second IP address) of the electronic device 201 associated with a second PDN by receiving the attach accept message from the base station 202.

Hereinafter, the connection between the electronic device 201 and the first PDN 291 may be referred to as the first PDN connection, and the connection between the electronic device 201 and the second PDN 292 may be referred to as the second PDN connection. According to an embodiment, the core network 299 may route data to the first PDN 291 or the second PDN 292 based on information of data transmitted from the electronic device 201 (e.g., an IP address of the electronic device 201).

According to various embodiments, the first PGW 281 and/or the second PGW 282 may provide anchoring for a user data connection of the electronic device 201. For example, although a base station associated with the electronic device 201 is changed according to movement of the electronic device 201, the first PGW 281 and/or the second PGW 282 may operate as an anchoring point.

According to various embodiments, the first PGW 281 may be a gateway for data communication with the first PDN 291 specified by an MNO associated with the core network 299. For example, the MNO may apply different billing policies to data communication through the first PGW 281 and data communication through the second PGW 282. According to an embodiment, the MNO may fail to charge for data communication through a connection with the first PDN 291 (e.g., the first PDN connection). For example, the MNO may specify data communication via the first PGW 281 as free data communication. For example, the first PDN 291 may be a PDN specified for free data communication by the MNO.

According to various embodiments, the second PGW 282 may be a gateway for data communication with the second PDN 292 specified by the MNO associated with the core network 299. According to an embodiment, the MNO may specify the second PDN 292 as a default internet PDN for subscribers. For example, the MNO may charge a fee for data communication via the second PGW 282 based on billing information associated with the electronic device 201.

According to various embodiments, the electronic device 201 may communicate with the first PDN 291 through the first PDN connection. The electronic device 201 may communicate with the second PDN 292 through the second PDN connection. For example, the core network 299 may route data depending on a PDN connection associated with data transmitted from the electronic device 201. The core network 299 may route data from an external electronic device (not shown) to the electronic device 201 depending on a PDN connection associated with the data transmitted from the external electronic device to the electronic device 201.

Figure 3:
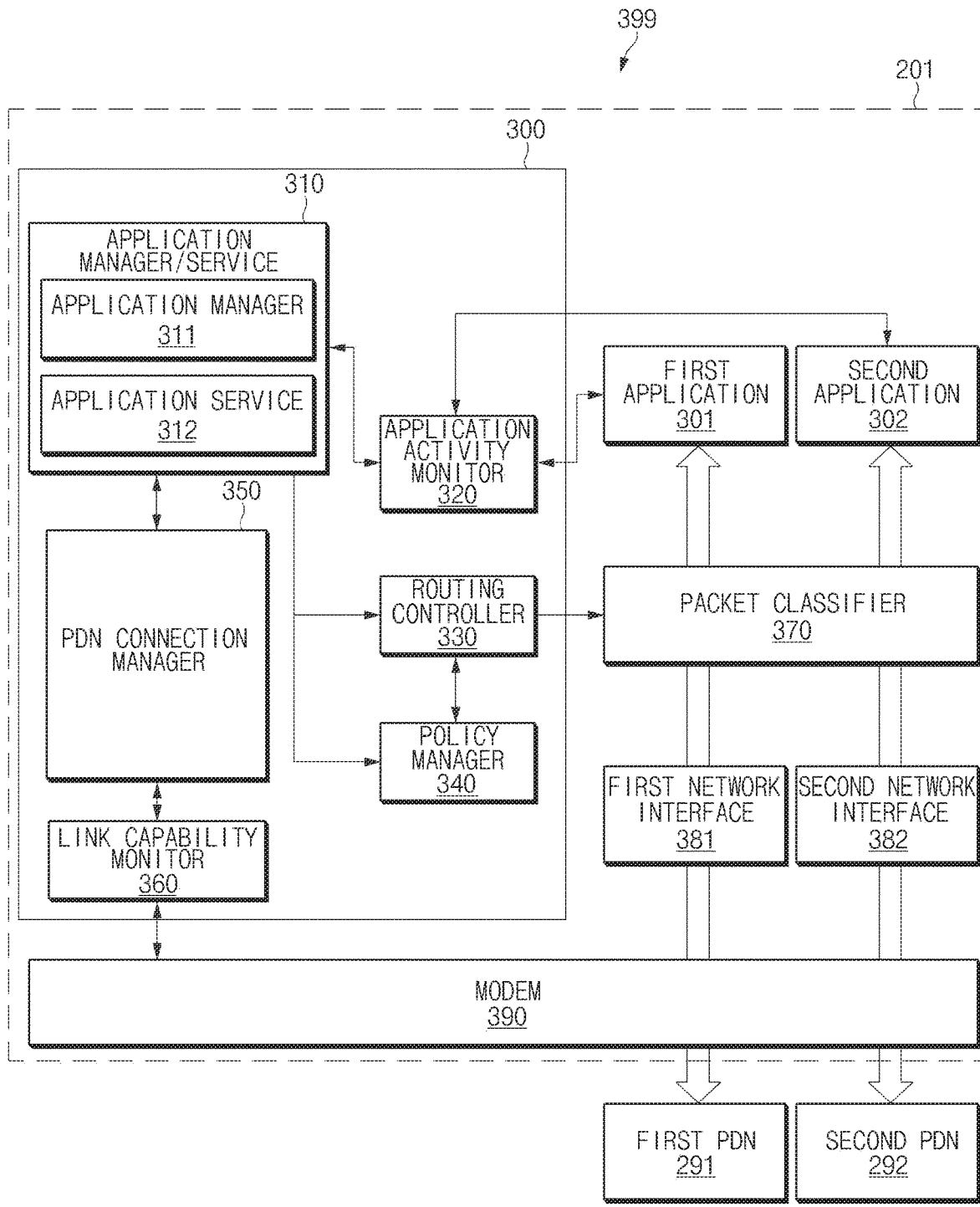
FIG. 3 is a block diagram illustrating an electronic device according to an embodiment of the disclosure.

FIG. 3 is a block diagram 399 illustrating an electronic device according to an embodiment of the disclosure.

A description will be given of various operations of the electronic device 201 with reference to FIG. 3. According to an embodiment, in communication using a first PDN connection, the electronic device 201 may perform communication using a first IP address assigned by a first PGW (e.g., the first PGW 281 of FIG. 2). For example, when transmitting data through the first PDN connection, the electronic device 201 may set a sender of data to the first IP address. For example, when a recipient receives data assigned to the first IP address, a core network (e.g., the core network 299 of FIG. 2) may route the data to the electronic device 201. According to an embodiment, in communication using a second PDN connection, the electronic device 201 may perform communication using a second IP address assigned by a second PGW (e.g., the second PGW 282 of FIG. 2). For example, when transmitting data through the second PDN connection, the electronic device 201 may set a sender of the data to the second IP address. For example, when a recipient receives data assigned to the second IP address, the core network 299 may route the data to the electronic device 201.

Referring to FIG. 3, a first application 301 may be a specified application. For example, the specified application may be an application which performs data communication using the first PDN connection with a specified first PDN 291. A second application 302 may be an application which performs data communication using the second PDN connection with the second PDN 292 (e.g., a default internet PDN of the electronic device 201). For example, each of the first application 301 and the second application 302 may be an application configured to perform data communication over a default network (e.g., the second PDN 292). An application connection manager 300 may transmit only data corresponding to the specified first application 301 between the first application 301 and the second application 302, each of which requests data communication over the same network, to the first PDN 291.

The components of the electronic device 201 shown in FIG. 3 are merely illustrative, and the configuration of the electronic device 201 is not limited to the components shown in FIG. 3. The components of the electronic device 201 shown in FIG. 3 may be hardware and/or software modules. For example, the application connection manager 300, the first application 301, the second application 302, an application manager/service 310, an application activity monitor 320, a routing controller 330, a policy manager 340, a PDN connection manager 350, a link capability monitor 360, a packet classifier 370, a first network interface 381, and/or a second network interface 382, which is shown in FIG. 3, may be a software function and/or data generated as instructions stored in a memory of the electronic device 201 (e.g., the memory 230 of FIG. 2) are executed by a processor (e.g., the processor 220 of FIG. 2). For example, a modem 390 shown in FIG. 3 may be a hardware component of the electronic device 201 (e.g., the communication circuitry 290 of FIG. 2).

According to various embodiments, the application connection manager 300 may support a PDN connection to a specified PDN of a specified application (e.g., the first PDN 291 of FIG. 2) without correction of an application (e.g., the first application 301 and/or the second application 302). The application connection manager 300 may establish, release, and/or manage the PDN connection to the specified PDN. For example, the application connection manager 300 may establish, release, and/or manage the PDN connection to the specified PDN using APN information. For example, the application connection manager 300 may be middleware of the electronic device 201 (e.g., middleware 144 of FIG. 1). The application connection manager 300 may be a framework program which interfaces with other applications (e.g., the first application 301 and/or the second application 302).

According to an embodiment, the application connection manager 300 may obtain APN information through various paths. For example, the application connection manager 300 may obtain APN information from the memory 230 or a subscriber identity module (SIM) (not shown) of the electronic device 201. For another example, the application connection manager 300 may obtain APN information from an external server (e.g., an MNO server).

For example, the APN information may include name information, an APN, proxy/port information, a multimedia messaging service center (MMSC), proxy information of an MMS, port information of the MMS, authentication information required by an MNO, authentication type information, a mobile country code/mobile network code (MCC/MNC), the type of IP protocol used for a PDN connection corresponding to the APN, a roaming protocol (e.g., home or roaming) used for the PDN connection corresponding to the APN, a maximum transmission unit, and/or a mobile virtual network operator (MVNO) match type/data. The name information may include, for example, name information of a carrier corresponding to the APN. The proxy/port information may include, for example, hypertext transfer protocol (HTTP) proxy/port information used for all web traffic for a PDN connection corresponding to the APN. The MMSC may include, for example, an MMSC server address. The authentication information required by the MNO may include a user ID and a password. The authentication type information may include, for example, authentication method information used for user authentication. The type of IP protocol used for the PDN connection corresponding to the APN may include, for example, IPv4 and/or IPv6. The roaming protocol used for the PDN connection corresponding to the APN may indicate home or roaming. For example, the maximum transmission unit may indicate a size of the maximum transmission unit capable of being transmitted. For example, the MVNO match type/data may be information indicating whether information about the APN is applied to a specific MNVO on a limited basis. For example, the MNVO match type/data may be set to none, a service provider name (SPN), international mobile subscriber identity (IMSI), a group identifier (GID), or an integrated circuit card identifier (ICCID). For example, the APN information may include information of a supported PDN type, supporting network type information, and/or special purpose configuration. For example, the information of the supported PDN type may include information about an internet protocol version supported by a PDN corresponding to the APN. For example, the supporting network type information may include information about radio access technology (RAT) supported by the PDN corresponding to the APN. The special purpose configuration may indicate whether a PDN connection corresponding to the APN is permitted for data communication of a specified purpose.

According to an embodiment, the application connection manager 300 may manage APN information used to configure an APN of a specified PDN (e.g., the first PDN 291). According to an embodiment, the application connection manager 300 may change at least a portion of APN information. For example, the application connection manager 300 may change the special purpose configuration and may permit a PDN connection to the specified PDN (e.g., the first PDN 291). For another example, the application connection manager 300 may change at least a portion of APN information depending on a specified time period and/or an MNO associated with the electronic device 201. According to an embodiment, the application connection manager 300 may limit access of another module to APN information of the specified PDN. For example, the application connection manager 300 may limit read and/or write of another module to the APN information of the specified PDN.

According to an embodiment, the application connection manager 300 may control a PDN connection such that the electronic device 201 is connected to the specified PDN (e.g., the first PDN 291) based on APN information. The application connection manager 300 may control the electronic device 201 to request a first PDN connection to the first PDN 291 when the specified first application 301 is executed or when the electronic device 201 is booted. For example, the electronic device 201 may obtain its address (e.g., a first IP address) associated with the first PDN through a response to the request for the first PDN connection.

According to an embodiment, the application connection manager 300 may control the electronic device 201 such that only data associated with a specified application uses the first PDN connection. For example, the application connection manager 300 may prevent data associated with the second application 302 rather than the specified application from not using the first PDN connection.

According to an embodiment, when a request for a connection to the specified first PDN 291 is received (e.g., after the electronic device 201 is booted or when the specified first application 301 is executed), the application connection manager 300 may determine whether to connect to the first PDN 291. For example, the application connection manager 300 may determine whether to connect to the first PDN 291, based on application information (e.g., an application identifier and/or application permission information) associated with the request for the connection to the first PDN 291. For example, when a connection request for data transmission associated with an application corresponding to the specified application is received, or when the specified application is installed in the electronic device 201, the application connection manager 300 may determine to connect to the first PDN 291. For example, the application identifier may include a package name associated with the application, a user ID, and/or any identifier associated with the application.

According to an embodiment, the application connection manager 300 may control the specified application (e.g., the first application 301) based on a connection to the specified first PDN 291. For example, when the specified application is executed before the connection with the first PDN 291, the application connection manager 300 may hold the execution of the specified application or may restart the specified application after the connection of the first PDN 291.

According to an embodiment, the application connection manager 300 may maintain the connection with the specified first PDN 291 after the specified application (e.g., the first application 301) is ended. For example, when connected with the first PDN 291 as the first application 301 is run, the application connection manager 300 may maintain the connection with the first PDN 291 such that the request for the connection to the first PDN 291 is maintained after the first application 301 is ended. According to an embodiment, an application manager 311 and/or an application service 312 is ended, the application connection manager 300 may release the first PDN connection.

According to an embodiment, the application connection manager 300 may route a data packet such that data from the specified application (e.g., the first application 301) is transmitted to the specified PDN (e.g., the first PDN 291). For example, in configuring a communication environment (e.g., a socket) of an application, the application connection manager 300 may configure the communication environment using routing information corresponding to the application. For example, a communication environment configured for the first application 301 may be associated with the first network interface 381, and a communication environment configured for the second application 302 may be associated with the second network interface 382. The application connection manager 300 may configure a communication environment of the specified application to use a network interface (e.g., the first network interface 381) associated with the specified PDN (e.g., the first PDN 291) with respect to the specified application to route a data packet such that data associated with the specified application uses the specified PDN. For example, the first application 301 may perform data transmission and reception using the communication environment (e.g., the socket) configured by the application connection manager 300.

According to an embodiment, the application connection manager 300 may configure the communication environment (e.g., the socket) of the application using routing information corresponding to the application. For example, the routing information corresponding to the application may be information indicating whether to use a certain PDN (e.g., the first PDN 291 or the second PDN 292) for the application. The routing information corresponding to the application may be information indicating whether to connect the application to a certain PDN.

For example, when the specified first application 301 requests a connection to the second PDN 292, the application connection manager 300 may configure a communication environment associated with the first PDN 291 with respect to the first application 301. In this case, data about the first application 301 may be transmitted and received using the first network interface 381. Because the first application 301 uses a communication environment generated by a request for the second PDN connection, the communication environment may be recognized as data communication using the second PDN connection, but data of the first application 301 may be actually transmitted and received using the first PDN connection.

According to an embodiment, the application connection manager 300 may route data associated with the specified application to be transmitted to the specified PDN. For example, the application connection manager 300 may route data from the first application 301 to the first network interface 381 corresponding to the first PDN 291 to transmit the data over the first PDN 291. According to an embodiment, the application connection manager 300 may receive downlink data about the specified first application 301 using the first network interface 381.

According to an embodiment, when an unspecified application (e.g., the second application 302) wants to transmit data using a specified PDN connection to use the specified PDN, the application connection manager 300 may omit a data packet generated from the unspecified application. For example, the second application 302 may configure a communication environment (e.g., a socket) for the first PDN connection and may attempt to perform data communication using the first network interface 381. In this case, the application connection manager 300 may omit data associated with the second application 302 using the packet classifier 370.

According to an embodiment, the application connection manager 300 may receive information of the specified application from an external server (e.g., an MNO server) to use the specified PDN. For example, the application connection manager 300 may receive specified application information using the specified PDN (e.g., a specified IP address). For example, the application connection manager 300 may store the received specified application information in the memory 230 of the electronic device 201.

Referring to FIG. 3, according to various embodiments, the application connection manager 300 may include the application manager/service 310, the application activity monitor 320, the routing controller 330, the policy manager 340, the PDN connection manager 350, and/or the link capability monitor 360.

According to various embodiments, the application manager/service 310 may establish a connection of the specified PDN (e.g., the first PDN 291 of FIG. 2). For example, the application manager/service 310 may establish or release a PDN connection to the specified PDN. According to an embodiment, the application manager/service 310 may determine whether there is the PDN connection to the specified PDN. For example, the application manager/service 310 may determine whether there is the PDN connection to the specified PDN (hereinafter referred to as "specified PDN connection") based at least on whether an application configured to use the specified PDN is installed. According to an embodiment, when an application (e.g., the second application 302) which is not configured to use the specified PDN (e.g., the first PDN 291) wants to communicate using the specified PDN, the application manager/service 310 may determine whether to omit data of the application which is not configured to use the specified PDN.

According to an embodiment, the application manager/service 310 may deliver application information (e.g., an application identifier) to use the specified PDN connection to the policy manager 340. For example, when the PDN connection to the specified PDN is determined, the application manager/service 310 may deliver application information used for the specified PDN connection to the policy manager 340. For example, the application information used for the specified PDN connection may be information of an application installed in the electronic device 201 among specified applications configured to use the specified PDN connection. For example, the application information to use the specified PDN connection may include information of an application registered with the application manager/service 310.

According to an embodiment, the application manager/service 310 may include the application manager 311 and the application service 312. For example, the application service 312 may operate on the memory of the electronic device 201 after the application manager 311 is ended and may maintain the first PDN connection with the specified first PDN 291. For example, the application service 312 and the application manager 311 may perform at least some of the above-mentioned operations of the application manager/service 310.

According to an embodiment, the application manager/service 310 may obtain data use information through the first PDN connection with the first PDN 291. For example, the electronic device 201 may generate data use statistics information based on the data use information. For example, the data use statistics information may include all data usage through the first PDN connection and/or data usage for each application. According to an embodiment, the electronic device 201 may display the data use statistics information on a display of the electronic device 201 (e.g., the display device 160 of FIG. 1). According to an embodiment, the electronic device 201 may transmit the data use statistics information to an external server (e.g., an MNO server and/or a manufacturer server). For example, the electronic device 201 may transmit the data use statistics information to the external server based on a specified period, a user input or a request from the external server. According to an embodiment, the electronic device 201 may receive data usage associated with the first PDN connection of the electronic device 201 from the external server. For example, the electronic device 201 may update data use information based on the data usage obtained from the external server.

According to various embodiments, the application manager/service 310 may control data transmission and reception of the electronic device 201 according to handover to a Wi-Fi network. For example, the electronic device 201 may be connected to the Internet over the Wi-Fi network using the communication circuitry 290. For example, when the electronic device 201 hands over from a cellular network (e.g., the second PDN connection) to the Wi-Fi network, the second PDN connection of the electronic device 201 may be disconnected. For example, the application (e.g., the first application 301 and/or the second application 302) may identify a current network state of the electronic device 201 (e.g., a state of a default PND connection (e.g., the second PDN)) using a specified function (e.g., an application programming interface (API)). For example, when a request to identify a network state is received from the application, the PDN connection manager 350 may deliver the current network state (e.g., a connection or disconnection of the default internet PDN) to the application. For example, when a network state (e.g., a disconnection) of the electronic device 201, changed due to handover or the like, is delivered to the application, frame loss may occur temporarily in the application which is running, due to a change in network state.

According to an embodiment, although connected to the Internet over the Wi-Fi network, the application manager/service 310 may transmit and receive data associated with the specified application through the first PDN connection. Although handing over from a default internet PDN (e.g., the second PDN 292) to the Wi-Fi network, the electronic device 201 may transmit and receive data associated with the specified application through the first PDN connection.

Figure 12:
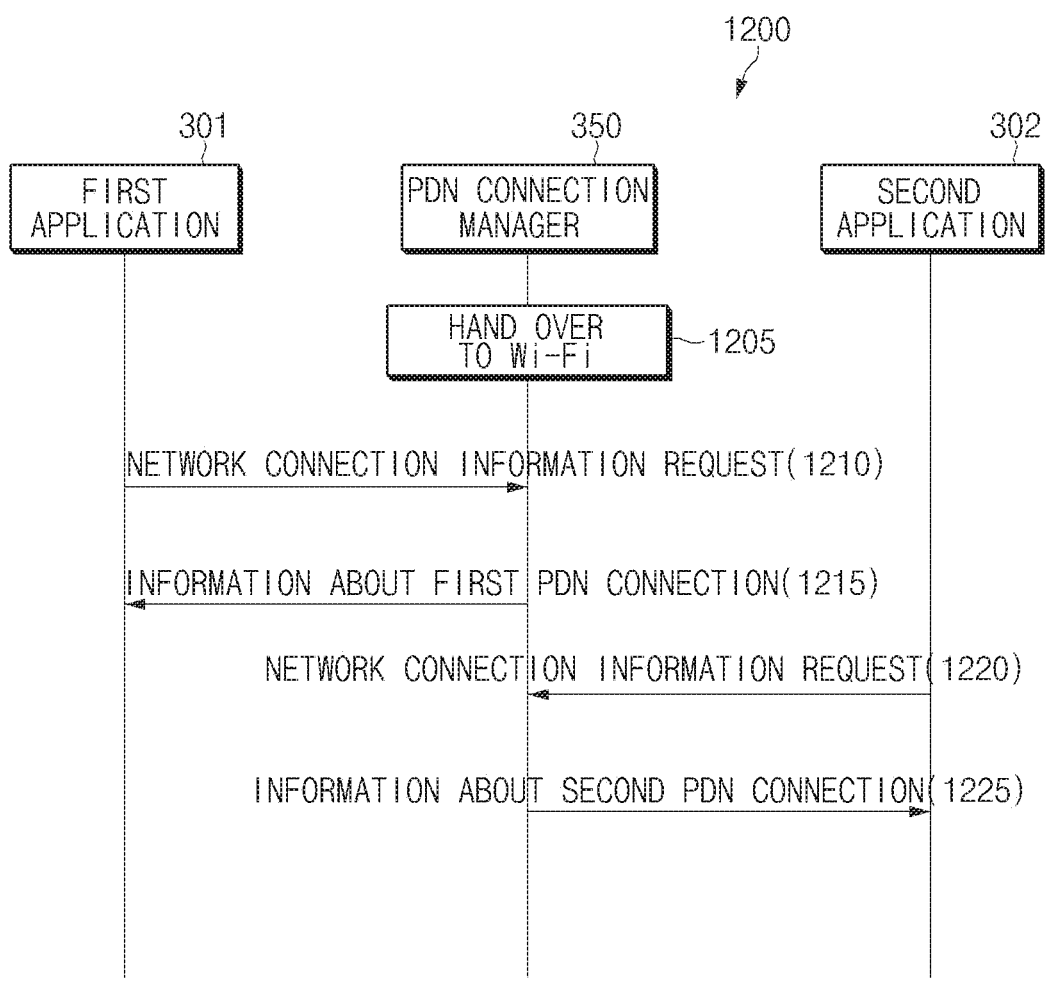
FIG. 12 is a signal sequence diagram illustrating a method for transmitting a network state according to an embodiment of the disclosure.

FIG. 12 is a signal sequence diagram 1200 illustrating a method for transmitting a network state according to an embodiment of the disclosure.

Referring to FIG. 12, when the electronic device 201 hands over to the Wi-Fi network, according to various embodiments, the PDN connection manager 350 may deliver information about a default PDN connection (e.g., the second PDN connection) or a specified PDN connection (e.g., the first PDN connection) based on whether the application is a specified application (e.g., an application specified to use the first PDN connection).

According to an embodiment, in operation 1205, the electronic device 201 may hand over to the Wi-Fi network. In this case, network connection information (e.g., second PDN connection information) of the electronic device 201 may change from a "connection" state from the first application 301 to a "disconnection" state by, for example, the PDN connection manager 350. In this case, the electronic device 201 may maintain the first PDN connection after handing over to the Wi-Fi network.

According to an embodiment, in operation 1210, the PDN connection manager 350 may receive a network connection information request from the first application 301. For example, the network connection information request may be a request of connection information about the default PDN connection (e.g., the second PDN connection). According to an embodiment, when a PDN connection network connection information request is received, in operation 1215, the PDN connection manager 350 may deliver information (e.g., connected) about the first PDN connection rather than the information about the default PDN connection (e.g., the second PDN connection) to the first application 301. Thus, because the first application 301 is recognized as a state where the default PDN connection (e.g., the second PDN connection) of the electronic device 201 is connected, temporary frame loss may be prevented.

According to an embodiment, in operation 1220, the PDN connection manager 350 may receive a network connection information request from the second application 302. When the network connection information request is received from the second application 302 which is not configured to use the first PDN connection, in operation 1225, the PDN connection manager 350 may deliver the second PDN connection information (e.g., information about the default PDN connection) to the second application 302. For example, the second PDN connection information may indicate a disconnection due to handover to Wi-Fi.

Referring again to FIG. 3, according to an embodiment, when connected to the Internet over the Wi-Fi network, the application manager/service 310 may control such that data associated with the specified application is transmitted and received over the Wi-Fi network. For example, when the electronic device 101 hands over from the Wi-Fi network to the default internet PDN (e.g., the second PDN 292), the application manager/service 310 may control such that data associated with the specified application is transmitted and received through the first PDN connection. According to various embodiments, the PDN connection manager 350 may control a network connection associated with the specified application depending on handover.

Figure 14:
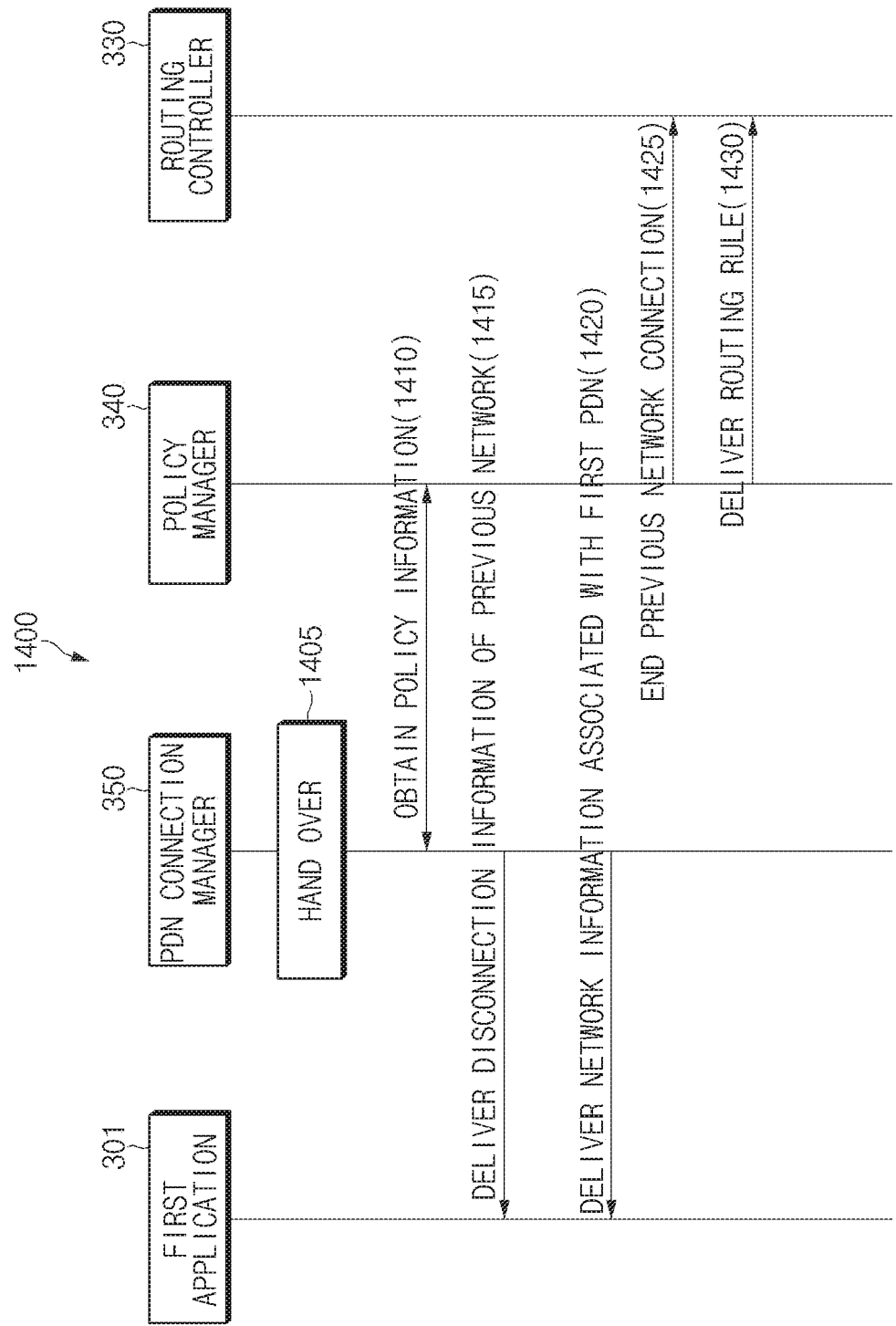
FIG. 14 is a signal sequence diagram illustrating a method for controlling a network connection according to an embodiment of the disclosure.

FIG. 14 is a signal sequence diagram 1400 illustrating a method for controlling a network connection according to an embodiment of the disclosure.

Referring to FIG. 14, for example, the first application 301 may perform data communication using the Wi-Fi network depending on handover from the first PDN 291 to the Wi-Fi network. The electronic device 201 may perform handover depending on a state of the Wi-Fi network.

According to an embodiment, in operation 1405, the PDN connection manager 350 may determine handover. For example, the PDN connection manager 350 may determine handover based on a connection state of a previous network (e.g., the Wi-Fi network or the second PDN connection). For example, the PDN connection manager 350 may determine handover depending on a Wi-Fi disconnection.

According to an embodiment, in operation 1410, the PDN connection manager 350 may obtain policy information from the policy manager 340 to perform the handover. For example, the PDN connection manager 350 may obtain policy information to determine a network to hand over.

According to an embodiment, in operation 1415, the PDN connection manager 350 may deliver disconnection information of a previous network (e.g., the second PDN connection or the Wi-Fi network) to the first application 301. For example, the disconnection information may be delivered as network state information to the first application 301.

According to an embodiment, in operation 1420, the PDN connection manager 350 may deliver network information (e.g., connected) associated with the first PDN 291 connected according to the handover to the first application 301. For example, the network information may be delivered as network state information to the first application 301. For example, the PDN connection manager 350 may perform handover to the first PDN 291 based on the policy information and may establish the first PDN connection, thus delivering the first PDN related network information to the first application 301.

According to an embodiment, in operation 1425, the policy manager 340 may deliver information indicating that a previous network connection is ended to the routing controller 330. In operation 1430, the policy manager 340 may deliver a routing rule to the routing controller 330 depending on the handover. For example, according to the routing rule, the routing controller 330 may route data associated with the first application 301 to be transmitted and received using the first PDN 291.

Referring again to FIG. 3, according to various embodiments, the application activity monitor 320 may monitor whether the specified application is run. According to an embodiment, the application activity monitor 320 may control to execute, end, and/or restart the specified application. When the first application 301 is run before a connection with the first PDN 291, the application activity monitor 320 may restart the first application 301 after the connection with the first PDN 291. According to an embodiment, the application activity monitor 320 may deliver information associated with activity of the specified application to the application manager/service 310 and may control the specified application based on instructions of the application manager/service 310.

According to various embodiments, the routing controller 330 may configure a routing rule under a policy of the policy manager 340. For example, the routing controller 330 may configure a communication environment of the specified application such that data associated with the specified application uses a network interface corresponding to the specified PDN. According to an embodiment, the routing controller 330 may configure a communication environment corresponding to the application using PDN information corresponding to the application. For example, the electronic device 201 may transmit a data packet associated with the first application 301 to the first PDN 291 using the first network interface 381 and the modem 390 through a communication environment (e.g., a socket) established based on information associated with the first PDN 291. For example, the electronic device 201 may transmit data associated with the second application 302 to the second PDN 292 using the second network interface 382 and the modem 390 through a communication environment established based on information associated with the second PDN 292.

According to an embodiment, the routing controller 330 may apply the configured routing rule to the packet classifier 370 to omit at least some data under the routing rule. For example, when the unspecified application (e.g., the second application 302) attempts to transmit data using the first PDN connection, the routing controller 330 may omit data associated with the second application 302 using the packet classifier 370.

According to various embodiments, the policy manager 340 may manage at least one rule associated with whether there is routing to the specified first PDN 291. For example, the policy manager 340 may manage an application list including at least one piece of application information capable of being routed to the first PDN 291. For example, the application information may include an application identifier and/or application permission.

According to various embodiments, the PDN connection manager 350 may manage the first PDN connection associated with the first PDN 291. For example, the PDN connection manager 350 may manage a PDN connection (e.g., the first PDN connection) requested by the application manager/service 310. According to an embodiment, the PDN connection manager 350 may obtain a first PDN connection state using the link capability monitor 360. According to an embodiment, the PDN connection manager 350 may disconnect the first PDN connection. For example, when communication quality of the first PDN connection is less than a specified state, the PDN connection manager 350 may disconnect the first PDN connection. For another example, when it is unable to connect to the first PDN 291 or when it is unable to use the first PDN connection, the PDN connection manager 350 may disconnect the first PDN connection or may disable the first PDN connection.

According to various embodiments, when at least a portion of the application connection manager 300 is ended, the electronic device 201 may disconnect the first PDN connection. For example, when at least a portion (e.g., the application manager/service 310) of the application connection manager 300 is ended, the PDN connection manager 350 may disconnect the first PDN connection. According to an embodiment, after disconnecting the first PDN connection, the electronic device 201 may transmit and receive data using the second PDN connection.

Figure 4:
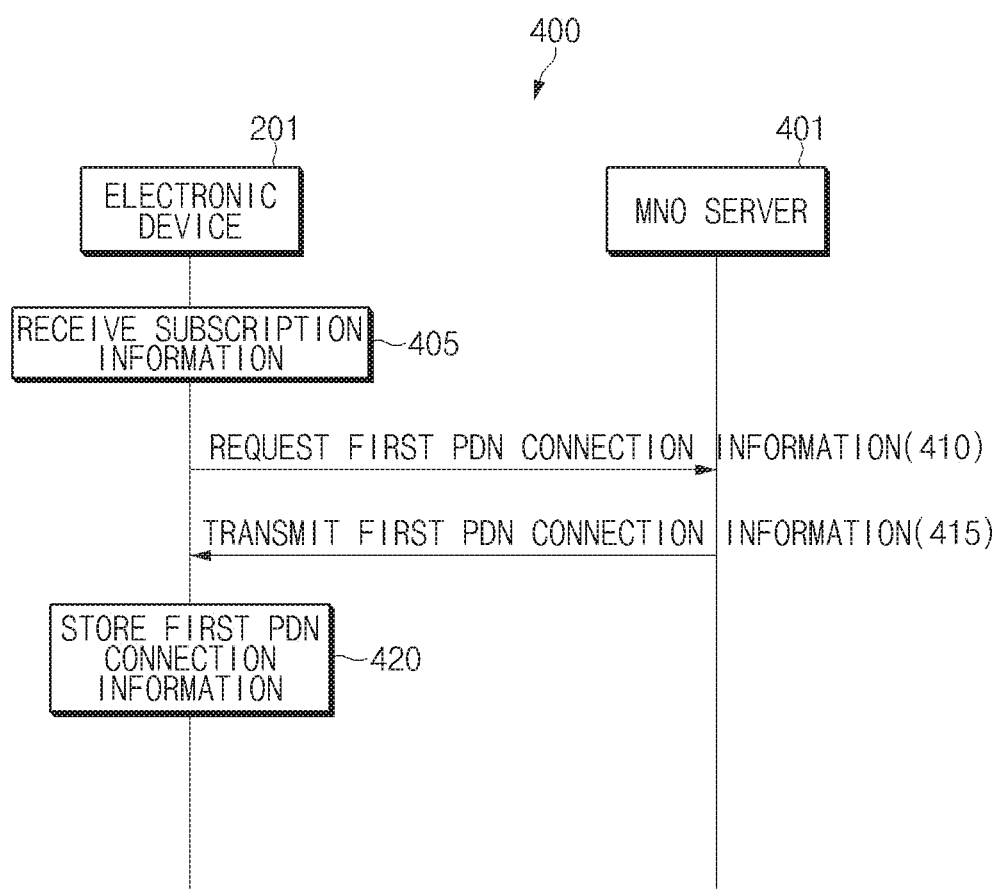
FIG. 4 is a signal sequence diagram illustrating a method for obtaining PDN connection information according to an embodiment of the disclosure.

FIG. 4 is a signal sequence diagram 400 illustrating a method for obtaining PDN connection information according to an embodiment of the disclosure.

Referring to FIG. 4, an MNO server 401 may be a server of a service provider associated with the electronic device 201. According to an embodiment, the electronic device 201 may communicate with the MNO server 401 using a communication circuitry (e.g., the communication circuitry 290 of FIG. 2).

According to various embodiments, in operation 405, the electronic device 201 may receive subscription information. According to an embodiment, the subscription information may be received in response to agreement on serving using a PDN connection to a specified PDN (e.g., the first PDN 291 of FIG. 2) (hereinafter referred to as "first PDN connection"). For example, when a specified application (e.g., the first application 301 of FIG. 3) is installed or when agreement on using the specified application is received, the electronic device 201 may receive the subscription information from a user or the specified application of the electronic device 201 (e.g., the first application 301 of FIG. 3).

According to various embodiments, in operation 410, the electronic device 201 may request first PDN connection information from the MNO server 401. For example, when the subscription information is received, an application connection manager of the electronic device 201 (e.g., the application connection manager 300 of FIG. 3) may request the first PDN connection information.

According to various embodiments, in operation 415, the MNO server 401 may transmit the first PDN connection information to the electronic device 201. For example, the first PDN connection information may include first PDN related network information for a connection to a first PDN (e.g., the first PDN 291 of FIG. 2) and/or first PDN related application information for routing to the first PDN 291. The network information may include, for example, the APN information described in detail with reference to FIG. 3. The network information may further include IP tuple information associated with the first PDN 291. For example, the application information may include a specified condition of a packet capable of being routed to the first PDN 291. For example, the application information may include information of at least one application capable of being routed to the first PDN 291.

According to various embodiments, in operation 420, the electronic device 201 may store the received first PDN connection information. For example, an application manager/service (e.g., the application manager/service 310 of FIG. 3) may deliver at least a portion of the received first PDN connection information to a policy manager (e.g., the policy manager 340 of FIG. 3). For example, the application manager/service 310 may deliver at least a portion of the received first PDN connection information to a routing controller (e.g., the routing controller 330 of FIG. 3).

Figure 5:
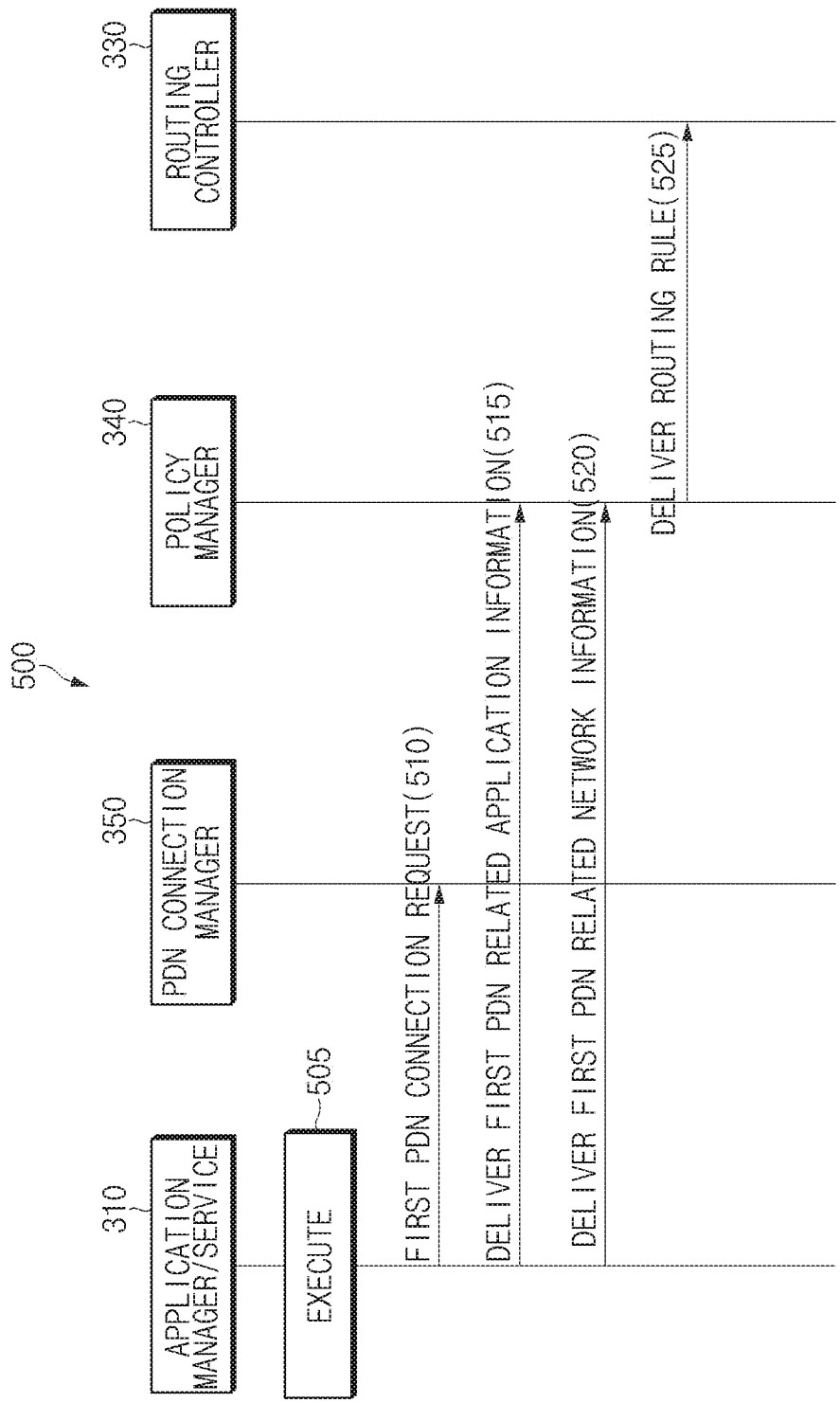
FIG. 5 is a signal sequence diagram illustrating a method for configuring a PDN connection according to an embodiment of the disclosure.

FIG. 5 is a signal sequence diagram 500 illustrating a method for configuring a PDN connection according to an embodiment of the disclosure.

Referring to FIG. 5, according to various embodiments, in operation 505, the application manager/service 310 may be executed. For example, the execution of the application manager/service 310 may be triggered by a specified event. For example, after an electronic device (e.g., the electronic device 201 of FIG. 2) is booted, the application manager/service 310 may be executed when a specified signal is received from an external electronic device or when a specified application (e.g., the first application 301 of FIG. 3) is run.

According to various embodiments, in operation 510, the application manager/service 310 may deliver a first PDN connection request for requesting a connection to a first PDN (e.g., the first PDN 291 of FIG. 2) to the PDN connection manager 350. For example, after the electronic device 201 is booted or when the specified application (e.g., the first application 301 of FIG. 3) is run, the application manager/service 310 may deliver the first PDN connection request to the PDN connection manager 350. The PDN connection manager 350 may establish a first PDN connection with the first PDN 291.

According to various embodiments, in operation 515, the application manager/service 310 may deliver first PDN related application information to the PDN connection manager 350. For example, the first PDN related application information may include a list of applications specified to use a first PDN connection. In operation 520, the application manager/service 310 may deliver first PDN related network information (e.g., network interface related information (e.g., an identifier) of the first PDN 291, APN information, and/or IP tuple information) for a connection to the first PDN (e.g., the first PDN 291 of FIG. 2) to the policy manager 340.

According to various embodiments, in operation 525, the policy manager 340 may transmit a routing rule configuration request to the routing controller 330. For example, the routing rule configuration request may include application information associated with the first PDN. According to an embodiment, the routing controller 330 may configure a routing rule based on the routing rule configuration request.

Referring to FIG. 5, operation 510, operation 515, and operation 520 may be performed at substantially the same time. For another example, operation 515 may be performed earlier than operations 510 and 520, or operation 520 may be performed earlier than operations 510 and 515.

Figure 6:
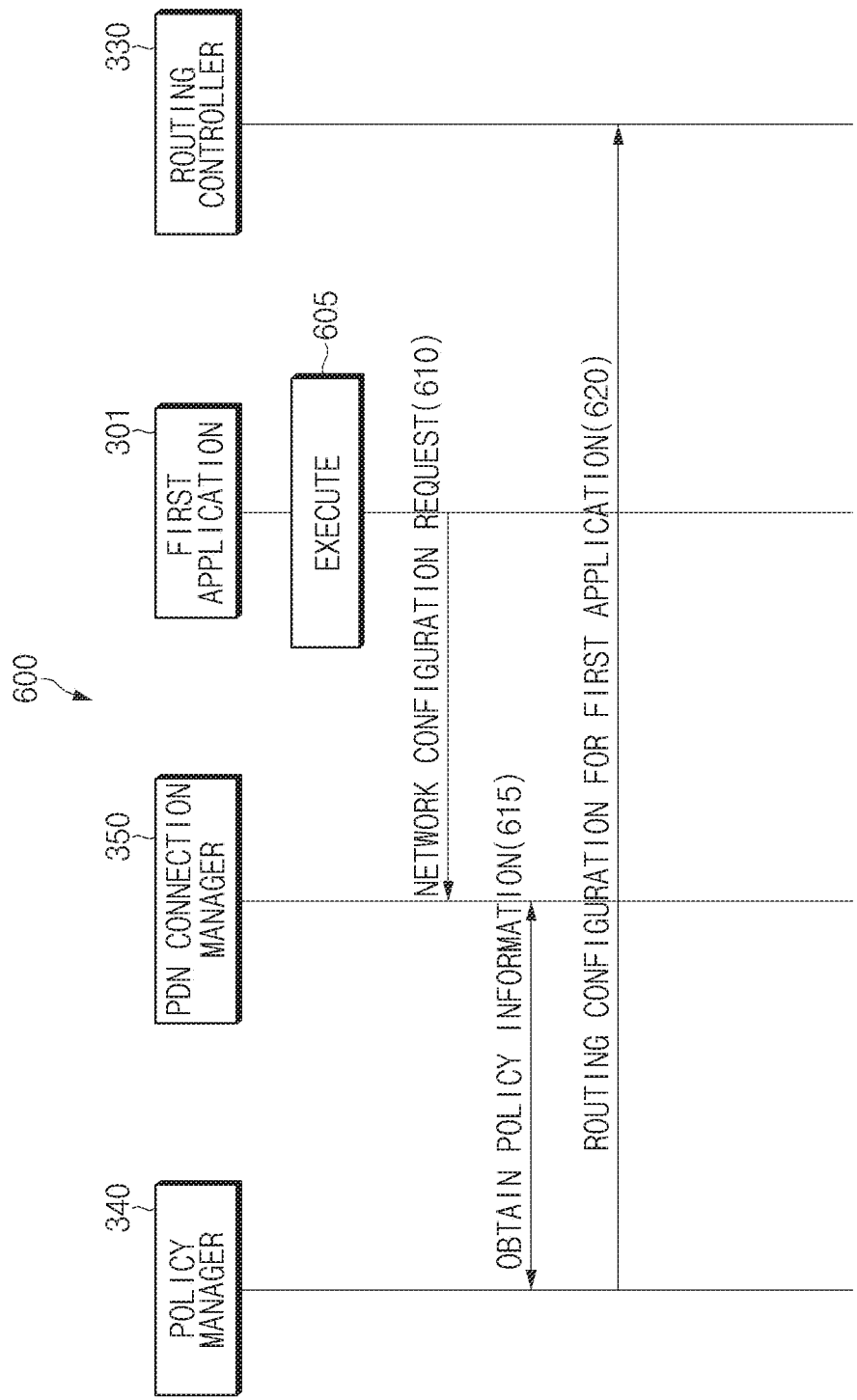
FIG. 6 is a signal sequence diagram illustrating a data communication method according to an embodiment of the disclosure.

FIG. 6 is a signal sequence diagram 600 illustrating a data communication method according to an embodiment of the disclosure.

Referring to FIG. 6, the first application 301 may be an application specified by a carrier to use a first PDN (e.g., the first PDN 291 of FIG. 2). Hereinafter, an application may be referred to as a program (e.g., a process and/or a thread).

According to an embodiment, in operation 605, the first application 301 may be run. For example, the first application 301 may be run based on a user input. For another example, the first application 301 may be generated or run in various states (e.g., a background or foreground service of an operating system). For another example, a processor or thread of the first application 301 may be generated or run in the background or foreground.

According to an embodiment, in operation 610, the first application 301 may deliver a network configuration request to the PDN connection manager 350. According to an embodiment, the network configuration request may include a network configuration request for a default bearer of an electronic device (e.g., the electronic device 201 of FIG. 2). For example, the network configuration request may include a proxy configuration request corresponding to a default internet PDN of the electronic device 201 (e.g., the second PDN 292 of FIG. 2).

According to an embodiment, in operation 615, the PDN connection manager 350 may obtain policy information from the policy manager 340. For example, the PDN connection manager 350 may determine whether the first application 301 corresponds to a specified application, using the policy information. According to an embodiment, when the first application 301 is the specified application, the PDN connection manager 350 may deliver connection state information of a first PDN connection rather than connection state information of a second PDN connection to the first application 301.

According to an embodiment, when the first application 301 is the application specified to use the first PDN connection, in operation 620, the policy manager 340 may deliver routing configuration for the first application 301 to the routing controller 330. For example, the routing configuration for the first application 301 may include at least one piece of configuration information to transmit and receive data using the first PDN connection.

According to an embodiment, the routing controller 330 may obtain the routing configuration for the first application 301 from the policy manager 340. For example, when a communication environment configuration request is received from the first application 301, the routing controller 330 may identify the routing configuration from the policy manager 340. The routing controller 330 may obtain the routing configuration depending on operation 620. For example, after executing the communication environment (e.g., operation 605), the first application 301 may deliver the communication environment configuration request to the routing controller 330.

According to an embodiment, the routing controller 330 may configure a communication environment of the first application 301 such that data about the first application 301 uses the first PDN 291 based on the routing configuration for the first application 301. For example, the routing controller 330 may apply a routing rule when configuring the communication environment (e.g., a socket) for the first application 301.

Figure 7:
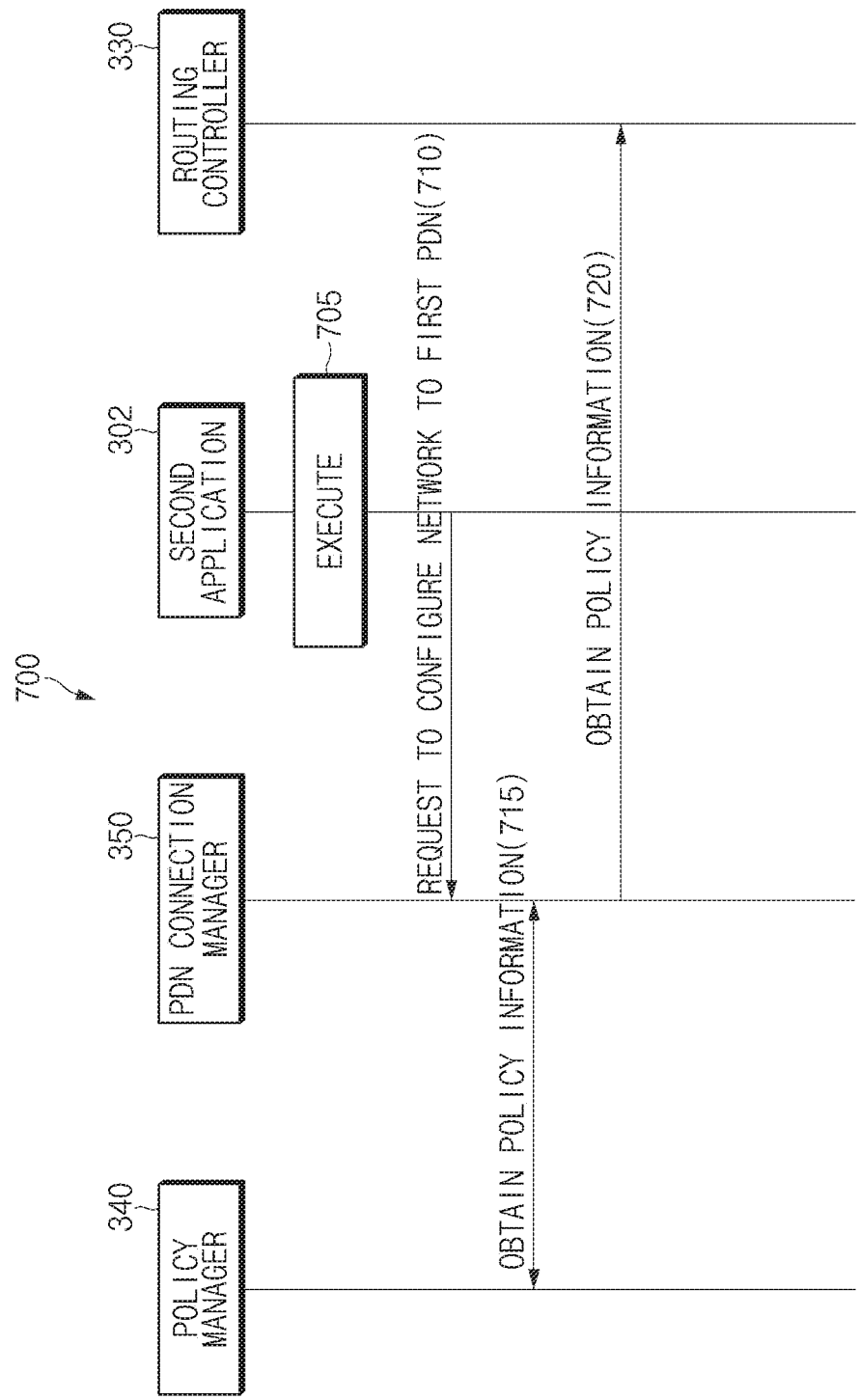
FIG. 7 is a signal sequence diagram illustrating a packet processing method according to an embodiment of the disclosure.

FIG. 7 is a signal sequence diagram 700 illustrating a packet processing method according to an embodiment of the disclosure.

Referring to FIG. 7, it is assumed that the second application 302 is not an application specified to use a first PDN (e.g., the first PDN 291 of FIG. 2). The second application 302 may be an application corrected to request a first PDN connection to the first PDN 291.

According to an embodiment, in operation 705, the second application 302 may be run. For example, the second application 302 may be run based on a user input. For another example, the second application 302 may be generated or run in various states (e.g., a background or foreground service of an operating system). For another example, a processor or thread of the second application 302 may be generated or executed in the background or foreground.

According to an embodiment, in operation 710, the second application 302 may deliver a network configuration request to the PDN connection manager 350. According to an embodiment, the network configuration request may include a network configuration request for the first PDN connection of the electronic device 201. For example, the network configuration request may include a proxy configuration request corresponding to the first PDN 291.

According to an embodiment, in operation 715, the PDN connection manager 350 may obtain policy information from the policy manager 340. For example, the PDN connection manager 350 may determine whether the second application 302 corresponds to a specified application, using the policy information.

According to an embodiment, when it is determined that the second application 302 does not correspond to the specified application, in operation 720, the PDN connection manager 350 may deliver a packet omission request to the routing controller 330. For example, when the packet omission request is received, the routing controller 330 may omit data associated with the second application 302 using a packet classifier (e.g., the packet classifier 370 of FIG. 3). For example, when the second application 302 attempts to transmit a data packet through the first PDN connection, the routing controller 330 may omit or decline the data packet.

Operation 720 is merely illustrative, and, when it is determined that the second application 302 does not correspond to the specified application, the PDN connection manager 350 may control data transmission and reception of the second application 302 such that data of the second application 302 is not transmitted and received using the first PDN connection. For example, although the first PDN connection is in a connection state, the PDN connection manager 350 may deliver that the first PDN connection is in a disconnection state to the second application 302 in response to a request to configure a network to the first PDN. For another example, the PDN connection manager 350 may block or ignore a request to configure the network to the first PDN from the second application 302.

Figure 8:
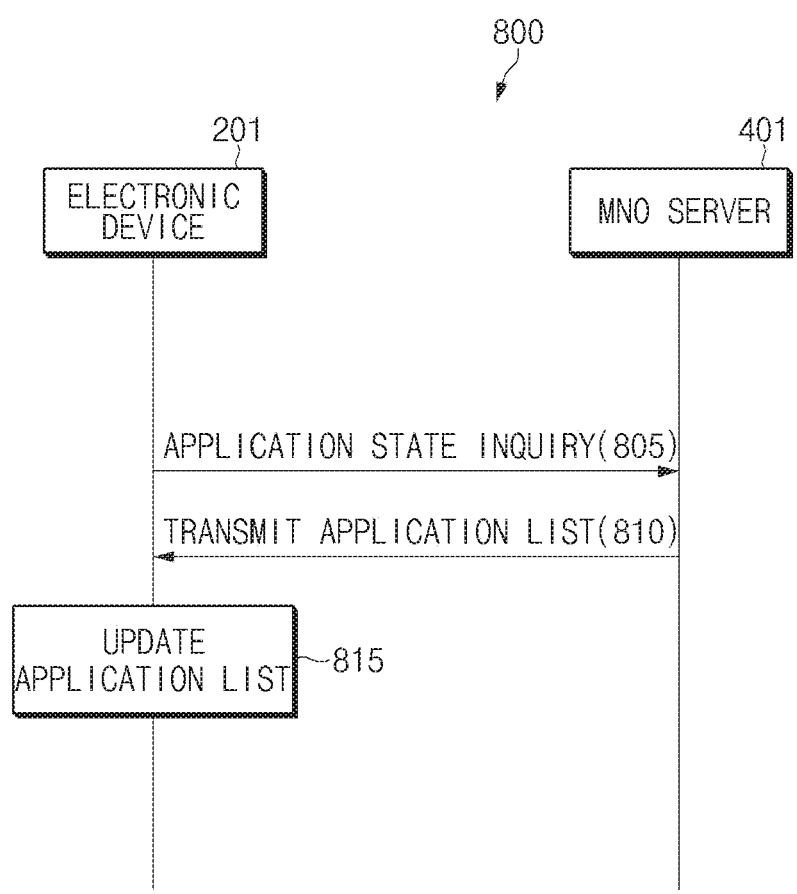
FIG. 8 is a signal sequence diagram illustrating a method for updating an application list according to an embodiment of the disclosure.

FIG. 8 is a signal sequence diagram 800 illustrating a method for updating an application list according to an embodiment of the disclosure.

Referring to FIG. 8, according to an embodiment, in operation 805, the electronic device 201 may transmit an application state inquiry to the MNO server 401. For example, the electronic device 201 may transmit the application state inquiry based on a user input, a specified period, or a specified event.

According to an embodiment, in operation 810, the MNO server 401 may transmit an application list to the electronic device 201. For example, the application list may include information of at least one application configured to use a specified PDN (e.g., the first PDN 291 of FIG. 2).

According to an embodiment, in operation 815, the electronic device 201 may update the stored application list using the received application list. For example, the application list may be application information managed by a policy manager (e.g., the policy manager 340 of FIG. 3). According to an embodiment, after updating the application list, the policy manager 340 may request a routing controller (e.g., the routing controller 330 of FIG. 1) to configure a routing rule.

Referring to FIG. 8, an embodiment is exemplified as the application list is updated based on the communication with the MNO server 401. However, embodiments of the disclosure are not limited thereto. For example, the electronic device 201 may update an application list using an external server (e.g., a manufacturer server) or an application of the electronic device 201. For example, the electronic device 201 may obtain an application list in which an application is added and/or removed, based on a user input to the application and may update the stored application list using the obtained application list. For another example, the electronic device 201 may receive an application list in which an application is added or removed from an external server (e.g., the MNO server 401 or the manufacturer server) and may update the stored application list using the received application list.

Figure 9:
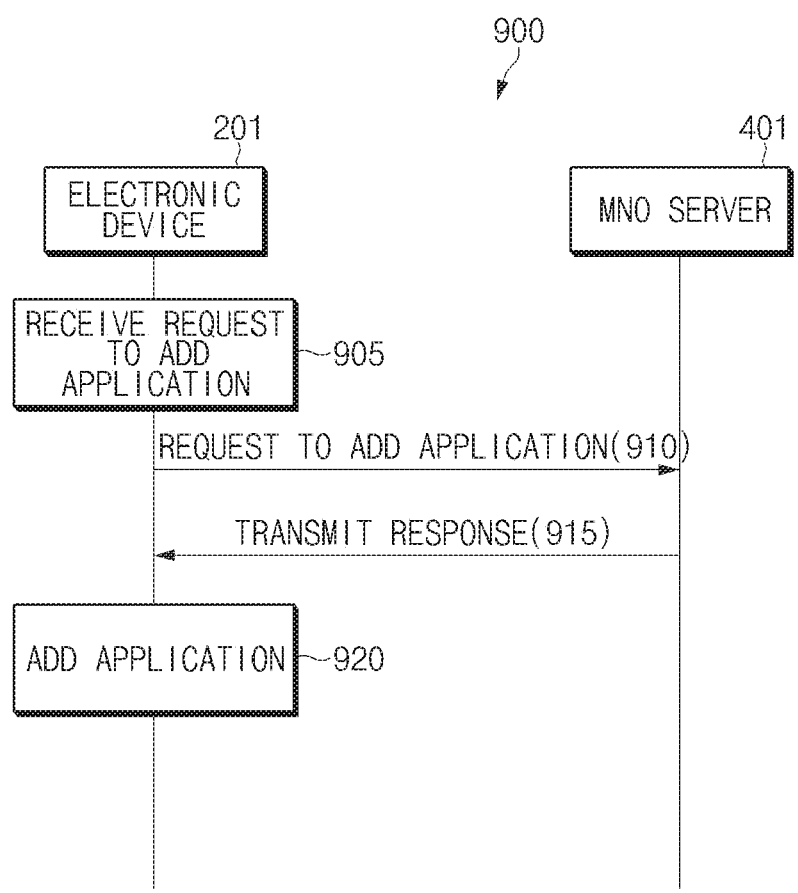
FIG. 9 is a signal sequence diagram illustrating a method for adding an application according to an embodiment of the disclosure.

FIG. 9 is a signal sequence diagram 900 illustrating a method for adding an application according to an embodiment of the disclosure.

Referring to FIG. 9, according to various embodiments, the electronic device 201 may change a list of specified applications capable of using a specified PDN (e.g., the first PDN 291 of FIG. 2), based on a user request.

According to an embodiment, in operation 905, the electronic device 201 may receive a request to add an application. For example, the request to add the application may correspond to selection of the application to be added. For example, the electronic device 201 may receive the request to add the application, using its specified configuration module.

According to an embodiment, in operation 910, the electronic device 201 may transmit the request to add the application to the MNO server 401. For example, the request to add the application may include information (e.g., an application identifier) of the application requested to be added.

According to an embodiment, in operation 915, the MNO server 401 may transmit a response to the request to add the application to the electronic device 201. For example, the response may include information indicative of accepting or declining the request to add the application.

According to an embodiment, when the response is indicative of accepting the request to add the application, in operation 920, the electronic device 201 may add the application requested to be added to the list of the specified applications.

Referring to FIG. 9, an embodiment is exemplified as the application is added based on the communication with the MNO server 401. However, embodiments of the disclosure are not limited thereto. For example, the electronic device 201 may update an application list based on communication with an external server (e.g., a manufacturer server). For another example, the electronic device 201 may add an application without communication with the external server (e.g., the manufacturer server and/or the MNO server 401). Furthermore, in FIG. 9, it is described that the application is added, but the electronic device 201 may delete an application from an application list in a similar manner.

Figure 10:
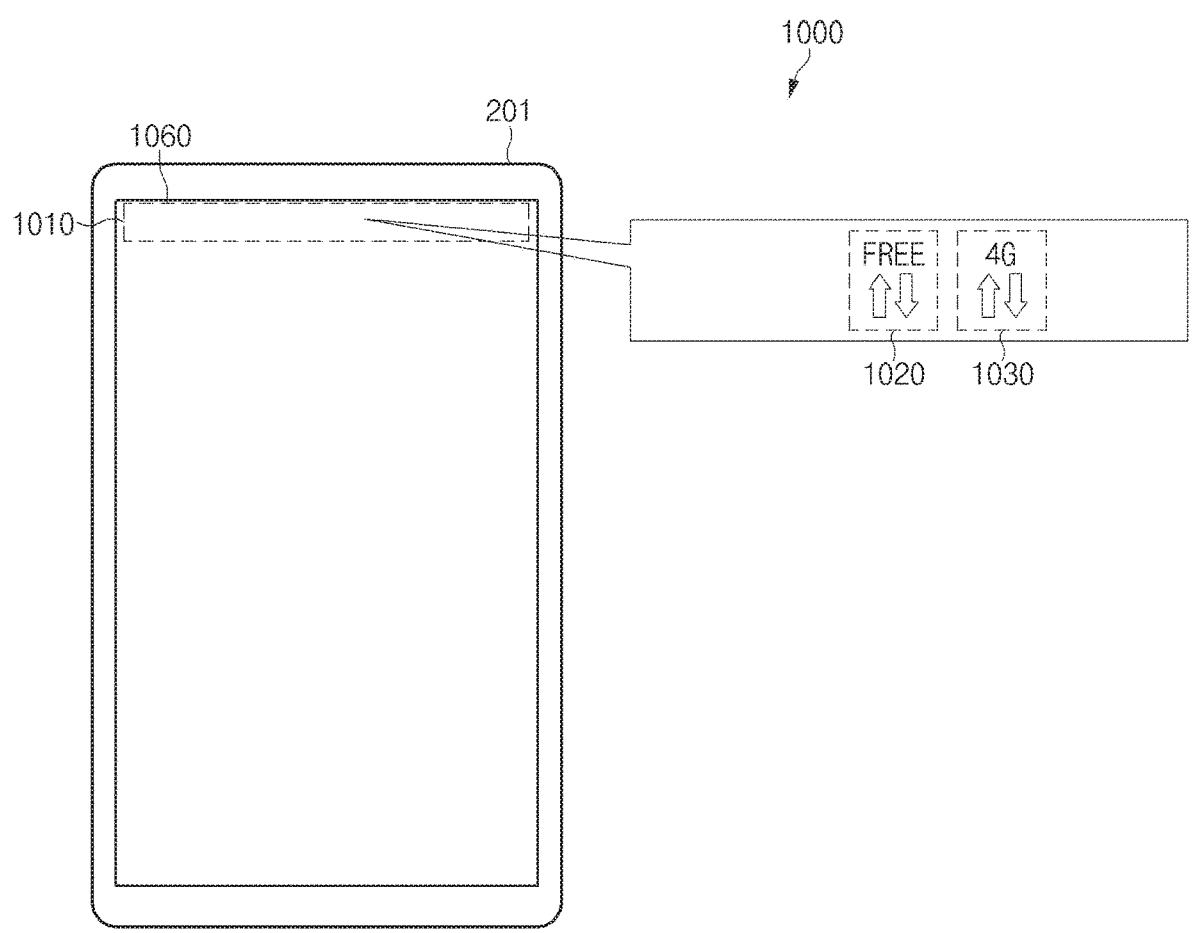
FIG. 10 is a drawing illustrating a user interface indicating a specified PDN connection according to an embodiment of the disclosure.

FIG. 10 is a drawing illustrating a user interface 1000 indicating a specified PDN connection according to an embodiment of the disclosure.

Referring to FIG. 10, according to various embodiments, the electronic device 201 may notify a user that a specified PDN connection (e.g., a PDN connection to the first PDN 291 of FIG. 2) is used. For example, the electronic device 201 may display a user interface associated with the specified PDN connection on a display region 1010 corresponding to a part of the display 1060 of the electronic device 201 (e.g., the display device 160 of FIG. 1). According to an embodiment, the display region 1010 may correspond to at least a portion of a status bar of the electronic device 201.

According to an embodiment, when the specified PDN connection is used, the electronic device 201 may display a first icon 1020 indicating that the specified PDN connection is used on the display region 1010. For example, the electronic device 201 may display the first icon 1020 together with a second icon 1030 corresponding to a default PDN connection of the electronic device 201 (e.g., a PDN connection to the second PDN 292 of FIG. 2). For another example, the electronic device 201 may display only the first icon 1020.

According to various embodiments, the electronic device 201 may fail to display whether to use the specified PDN connection. For example, the electronic device 201 may display only the second icon 1030 on the display region 1010 irrespective of the specified PDN connection.

Figure 11:
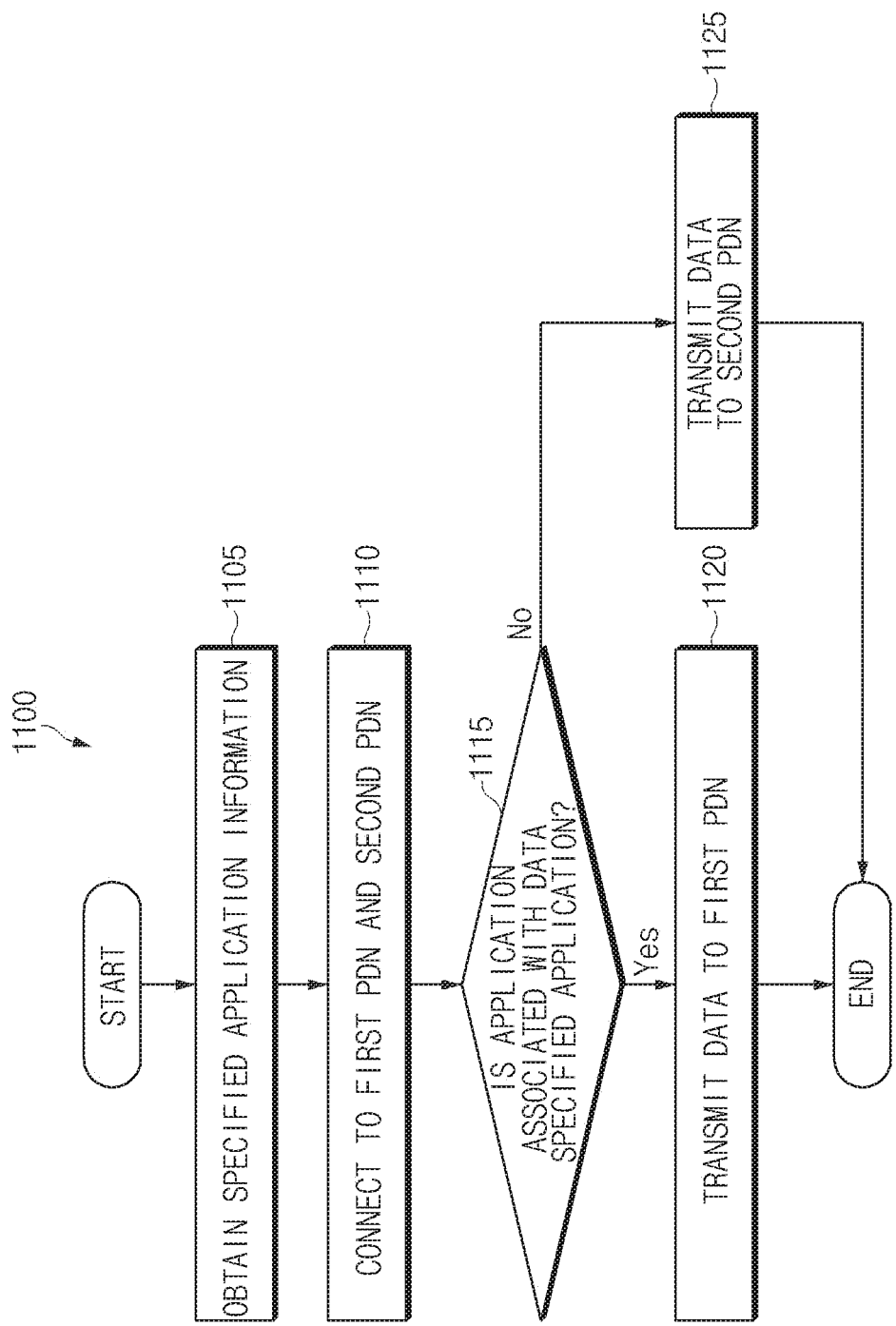
FIG. 11 is a flowchart illustrating a data transmission method according to an embodiment of the disclosure.

FIG. 11 is a flowchart 1100 illustrating a data transmission method according to an embodiment of the disclosure.

Referring to FIG. 11, according to various embodiments, an electronic device (e.g., the electronic device 201 of FIG. 2) may include a communication circuitry (e.g., the communication circuitry 290 of FIG. 2), a processor (e.g., the processor 220 of FIG. 2) operatively connected to the communication circuitry, and a memory (e.g., the memory 230 of FIG. 2) operatively connected to the processor. For example, the electronic device 201 may include a display (e.g., the display device 160 of FIG. 1). According to an embodiment, the memory 230 may store instructions, when executed, causing the processor 220 to perform operations of the electronic device 201, described below.

According to various embodiments, in operation 1105, the electronic device 201 may obtain specified application information. According to an embodiment, the electronic device 201 may obtain the specified application information to perform data communication using a first PDN (e.g., the first PDN 291 of FIG. 2). For example, the electronic device 201 may receive the specified application information from an external server (e.g., an MNO server). For another example, the electronic device 201 may receive the specified application information from the memory 230. For another example, the electronic device 201 may receive the specified application information from a base station (e.g., the base station 202 of FIG. 2).

According to an embodiment, the first PDN 291 may correspond to a specified internet PDN of an MNO associated with the electronic device 201, and the second PDN 292 may correspond to a default internet PDN associated with the MNO. For example, the first PDN 291 may be connected through a first PGW (e.g., the first PGW 281 of FIG. 2) and the second PDN 292 may be connected through a second PGW (e.g., the second PGW 282 of FIG. 2), and billing policies of the MNO for the first PGW 281 and the second PGW 282 may differ from each other.

According to various embodiments, in operation 1110, the electronic device 201 may be connected to the first PDN and a second PDN. According to an embodiment, the electronic device 201 may establish a first PDN connection to the first PDN 291 and a second PDN connection to the second PDN (e.g., the second PDN 292 of FIG. 2) using the communication circuitry 290. For example, the electronic device 201 may establish the first PDN connection using access point information (APN) information associated with the first PDN 291 and may establish the second PDN connection using APN information associated with the second PDN 292. For example, the APN information may include at least one of an APN of a related PDN, proxy information, port information, a user ID, or a password. According to an embodiment, after being booted, the electronic device 201 may establish the first PDN connection within a predetermined time or in response to the execution of the specified application.

According to various embodiments, in operation 1115, the electronic device 201 may determine whether an application associated with data is the specified application. According to an embodiment, the electronic device 201 may determine whether a first application which requests data transmission through the first PDN connection is an application included in the specified application information.

According to various embodiments, when the application is the specified application, in operation 1120, the electronic device 201 may transmit data to the first PDN 291. According to an embodiment, the electronic device 201 may transmit data associated with the application to the first PDN 291 through the first PDN connection. For example, the data associated with the application may be data requested to be transmitted by the application. According to an embodiment, the electronic device 201 may configure a communication environment (e.g., a communication socket) of the application depending on the first PDN connection to transmit the data associated with the application to the first PDN 291 through the first PDN connection or receive the data from the first PDN 291 through the first PDN connection.

According to various embodiments, when the application is not the specified application, in operation 1125, the electronic device 201 may transmit the data to the second PDN 292. According to an embodiment, the electronic device 201 may transmit the data associated with the application to the second PDN 292 through the second PDN connection.

According to various embodiments, when transmitting the data associated with the application to the first PDN 291 through the first PDN connection, the electronic device 201 may display information (e.g., a first icon of FIG. 10) indicating a billing policy, a use state, and/or a connection state, associated with the first PDN 291, on the display.

According to an embodiment, each of the first PDN connection and the second PDN connection may be a connection over a cellular network. For example, the electronic device 201 may be connected to the Internet over a Wi-Fi network. In this case, according to an embodiment, the electronic device 201 may transmit the data associated with the specified application to the first PDN 291 through the first PDN connection.

Figure 13:
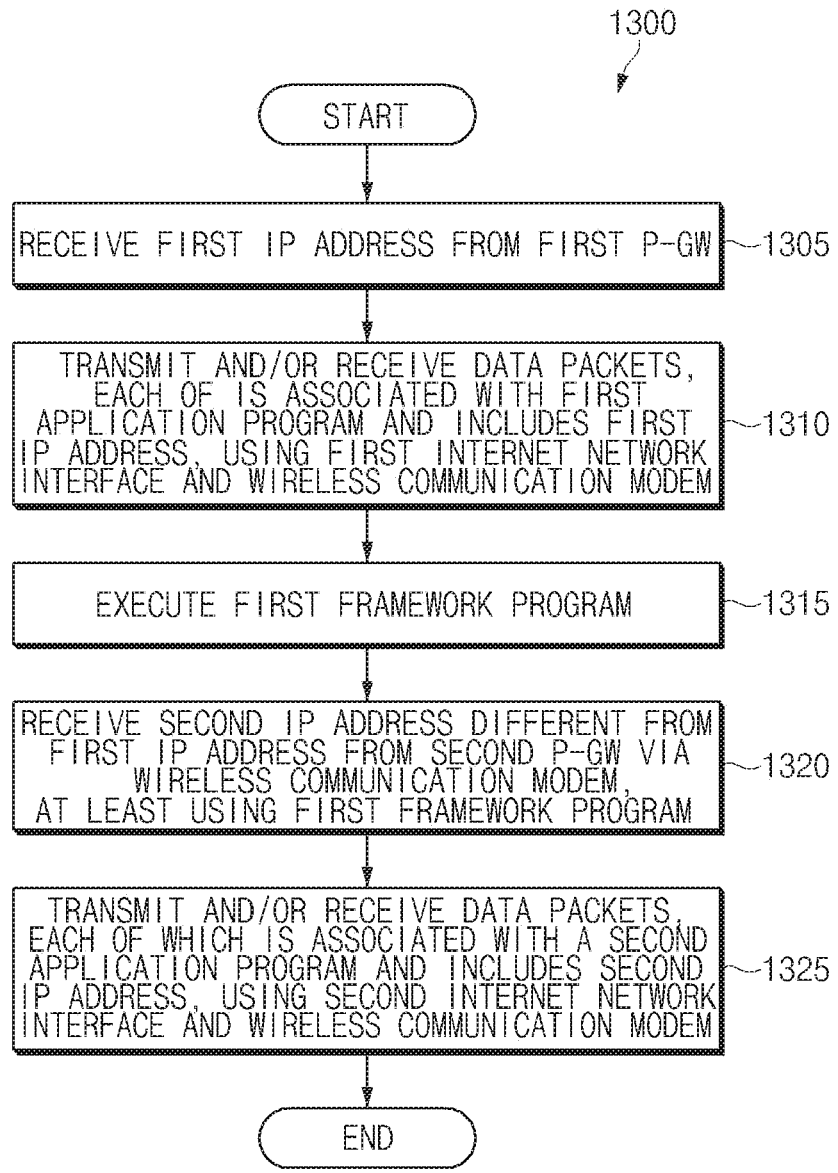
FIG. 13 is a flowchart illustrating a data communication method according to an embodiment of the disclosure.

FIG. 13 is a flowchart 1300 illustrating a data communication method according to an embodiment of the disclosure.

Referring to FIG. 13, according to various embodiments, an electronic device (e.g., the electronic device 201 of FIG. 2) may include a wireless communication module (e.g., the communication circuitry 290 of FIG. 2), a processor (e.g., the processor 220 of FIG. 2) operatively connected with the wireless communication modem, and a memory (e.g., the memory 230 of FIG. 2) operatively connected with the processor. According to an embodiment, the memory may store a first application program (e.g., the second application 302 of FIG. 3), a second application program (e.g., the first application 301 of FIG. 3), and a first framework program (e.g., the application connection manager 300 of FIG. 3) which interfaces with the first application program and the second application program and may store instructions, when executed, causing the processor to perform operations of the electronic device 201, described below.

According to various embodiments, in operation 1305, the electronic device 201 may receive a first internet protocol (IP) address from a first PGW (e.g., the second PGW 282 of FIG. 2) using the wireless communication modem. For example, the electronic device 201 may receive the first IP address as a response to an attach request. For example, the first IP address may be an address of the electronic device 201, associated with a first internet network interface (e.g., the second network interface 382 of FIG. 3).

According to various embodiments, in operation 1310, the electronic device 201 may transmit and/or receive data packets, each of which is associated with the first application program and includes the first IP address, using the first internet network interface and the wireless communication modem. For example, the electronic device 201 may transmit a data packet, which includes the first IP address as a sender address, using the first internet network interface (e.g., the second network interface 382 of FIG. 3). For example, the electronic device 201 may receive a data packet, which includes the first IP address as a recipient address, using the first internet network interface.

According to various embodiments, in operation 1315, the electronic device 201 may execute the first framework program. For example, after being booted, when a specified event occurs or when a related program is executed, the electronic device 201 may execute the first framework program.

According to various embodiments, in operation 1320, the electronic device 201 may receive a second IP address different from the first IP address, from a second PGW (e.g., the first PGW 281 of FIG. 2) via the wireless communication modem, at least using the first framework program. For example, the second IP address may be an address of the electronic device 201, associated with a second network interface (e.g., the first network interface 381 of FIG. 3).

According to an embodiment, the electronic device 201 may receive an application list, used by the first framework program, including a first identifier associated with the second application program, from an external server (e.g., the MNO server 401 of FIG. 4). For example, the electronic device 201 may receive an application list via the wireless communication modem using the second IP address.

According to various embodiments, in operation 1325, the electronic device 201 may transmit and/or receive data packets, each of which is associated with a second application program and includes the second IP address, using a second internet network interface and the wireless communication modem. For example, the electronic device 201 may transmit a data packet, which includes the second IP address as a sender address, using a second internet network interface. For example, the electronic device 201 may receive a data packet, which includes the second IP address as a recipient address, using the second interface network interface.

For example, the first application program may include a second identifier which is not included in the application list. According to an embodiment, after the first application program is executed, the first framework program may determine whether to use the first internet network interface, based on at least a portion of the application list.

For example, the second application program may include the first identifier included in the application list. According to an embodiment, the first framework program may determine whether to use the first internet network interface, based on at least a portion of the application list. For example, the first framework program may generate data packets, each of which includes the second IP address, to include data associated with the second application program, based on the determination.

According to an embodiment, when the first framework program is ended, the electronic device 201 may transmit and/or receive data using the wireless communication modem and the first internet network interface.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or B," "at least one of A, B, and C," and "at least one of A, B, or C," may include all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may connect a specified application to a specified PDN without correction of the application.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a communication circuitry;
a processor operatively connected to the communication circuitry; and
a memory operatively connected to the processor,
wherein the memory stores instructions that, when executed, cause the processor to:
obtain, from an external server, application information comprising information of at least one application configured to perform data communication using a first packet data network (PDN) which corresponds to a specified internet PDN of a mobile network operator (MNO) associated with the electronic device,
establish a first PDN connection to the first PDN and a second PDN connection to a second PDN using the communication circuitry, wherein the second PDN comprises a default internet PDN associated with the MNO, and
in response to a request for data transmission through the second PDN connection from a first application included in the application information, configure a first communication environment associated with the first PDN connection for the first application and transmit data associated with the first application to the first PDN.

2. The electronic device of claim 1,
wherein the instructions, when executed, further cause the processor to establish the first PDN connection using access point name (APN) information associated with the first PDN, and
wherein the APN information is stored in the memory.

3. The electronic device of claim 2, wherein the APN information includes at least one of an APN of the first PDN, proxy information of the first PDN, port information of the first PDN, a user ID, or a password.

4. The electronic device of claim 1,
wherein instructions, when executed, further cause the processor to, in response to a request for data transmission through the second PDN connection from a second application not included in the application information, configure a second communication environment associated with the second PDN connection for the second application and transmit data associated with the second application to the second PDN.

5. The electronic device of claim 4,
wherein the first PDN is connected via a first PDN gateway (PGW),
wherein the second PDN is connected via a second PGW, and
wherein billing policies of the MNO for the first PGW and the second PGW are different from each other.

6. The electronic device of claim 1, further comprising:
a display,
wherein the instructions, when executed, further cause the processor to, when transmitting the data associated with the first application to the first PDN through the first PDN connection, control a display to display information indicating at least one of a state where the first PDN is connected, a state where the first PDN is used, or a billing policy associated with the first PDN on the display.

7. The electronic device of claim 1,
wherein each of the first PDN connection and the second PDN connection comprises a connection over a cellular communication network,
wherein the electronic device is connected to an Internet through Wi-Fi using the communication circuitry, and
wherein the instructions, when executed, further cause the processor to transmit the data associated with the first application to the first PDN through the first PDN connection while the electronic device is connected to the internet through Wi-Fi.

8. The electronic device of claim 1, wherein the first application includes at least one of a process or a thread.

9. A data communication method of an electronic device, the method comprising:
obtaining, from an external server, application information comprising information of at least one application configured to perform data communication using a first packet data network (PDN) which corresponds to a specified internet PDN of a mobile network operator (MNO) associated with the electronic device;
establishing a first PDN connection to the first PDN and a second PDN connection to a second PDN, wherein the second PDN comprises a default internet PDN associated with the MNO; and
in response to a request for data transmission through the second PDN connection from a first application included in the application information, transmitting data associated with the first application to the first PDN through the first PDN connection.

10. The method of claim 9, wherein the establishing of the first PDN connection to the first PDN and the second PDN connection to the second PDN comprises establishing the first PDN connection using access point name (APN) information associated with the first PDN.

11. The method of claim 10, wherein the APN information includes at least one of an APN of the first PDN, proxy information of the first PDN, port information of the first PDN, a user ID, or a password.

12. The method of claim 9, further comprising:
in response to a request for data transmission through the second PDN connection from a second application not included in the application information, configuring a second communication environment associated with the second PDN connection for the second application and transmitting data associated with the second application to the second PDN,
wherein the first PDN is connected via a first PDN gateway (PGW),
wherein the second PDN is connected via a second PGW, and
wherein billing policies of the MNO for the first PGW and the second PGW are different from each other.

13. The method of claim 12, wherein each of the first application and the second application includes at least one of a process or a thread.

14. The method of claim 9, further comprising, when transmitting the data associated with the first application to the first PDN through the first PDN connection, displaying information indicating at least one of a state where the first PDN is connected, a state where the first PDN is used, or a billing policy associated with the first PDN on a display of the electronic device.

15. The method of claim 9,
wherein the transmitting of the data associated with the first application to the first PDN through the first PDN connection comprises transmitting the data associated with the first application to the first PDN through the first PDN connection during a communication connection through Wi-Fi, and
wherein the first PDN connection comprises a connection over a cellular network.

16. An electronic device, comprising:
a wireless communication modem;
a processor operatively connected to the wireless communication modem; and
a memory configured to be operatively connected with the processor and store a first application program, a second application program, and a first framework program interfacing with the first application program and the second application program,
wherein the memory is further configured to store instructions that, when executed, cause the processor to:
receive a first internet protocol (IP) address from a first packet data network gateway (PGW), using the wireless communication modem,
transmit and/or receive first data packets, each of which is associated with the first application program and includes the first IP address, using a first internet network interface and the wireless communication modem,
execute the first framework program,
receive a second IP address different from the first IP address from a second PGW via the wireless communication modem, at least using the first framework program, and
transmit and/or receive second data packets, each of which is associated with the second application program and includes the second IP address, using a second internet network interface and the wireless communication modem.

17. The electronic device of claim 16, wherein the instructions, when executed, further cause the processor to receive, from an external server, an application list used by the first framework program and including a first identifier associated with the second application program.

18. The electronic device of claim 17, wherein the instructions, when executed, further cause the processor to receive the application list via the wireless communication modem, using the second IP address.

19. The electronic device of claim 17,
wherein the first application program includes a second identifier which is not included in the application list, and
wherein the instructions, when executed, further cause the processor to, after the first application program is executed, determine whether the first framework program uses the first internet network interface, based on at least a portion of the application list.

20. The electronic device of claim 17, wherein the instructions, when executed, further cause the processor to, after the second application program is executed, determine whether the first framework program uses the second internet network interface, based on at least a portion of the application list.

* * * * *